United States Patent [19]

Near

[11] Patent Number: 4,492,874
[45] Date of Patent: Jan. 8, 1985

[54] SYNCHRONIZATION FUEL CONTROL FOR GAS TURBINE-DRIVEN AC GENERATOR BY USE OF MAXIMUM AND MINIMUM FUEL SIGNALS

[75] Inventor: Timothy P. Near, Scotia, N.Y.

[73] Assignee: General Electric Co., Schenectady, N.Y.

[21] Appl. No.: 371,881

[22] Filed: Apr. 26, 1982

[51] Int. Cl.³ .............................................. H02P 9/04
[52] U.S. Cl. .................................. 290/40 B; 290/40 R; 307/87
[58] Field of Search ............... 290/40 R, 40 A, 40 B; 307/87; 322/20, 22, 38

[56] References Cited

U.S. PATENT DOCUMENTS

| | | | |
|---|---|---|---|
| 3,520,133 | 7/1970 | Loft et al. | 60/39.14 R |
| 3,562,545 | 2/1971 | Rubner et al. | 307/87 |
| 3,794,846 | 2/1974 | Schlicher et al. | 307/87 |
| 3,801,796 | 4/1974 | Konrad | 307/87 |
| 3,892,978 | 7/1975 | Haley | 307/87 |
| 4,031,407 | 6/1977 | Reed | 307/87 |
| 4,118,635 | 10/1978 | Barrett et al. | 307/87 |
| 4,249,088 | 2/1981 | Kleba et al. | 307/87 |

OTHER PUBLICATIONS

Bruce O. Watkins, Introduction to Control Systems, MacMillan Series in Applied Systems Science, C. T. Leonides, Ed., 10.5, "Optimal Time Control", pp. 514–518, 525 and 526, The MacMillan Company, New York, 1969.

*Primary Examiner*—J. V. Truhe
*Assistant Examiner*—Shelley Wade
*Attorney, Agent, or Firm*—J. C. Squillaro

[57] ABSTRACT

Systems and methods for synchronizing a gas turbine-driven generator to an AC power system by employing optimal time control theory to directly drive the turbine-generator to a synchronizing point. The fuel commands, synchronization points, and trajectories are selected in view of the need to minimize thermal stress on the turbine hot-gas-path parts, while also minimizing time required for synchronization. Digital computer and analog implementations are disclosed.

51 Claims, 22 Drawing Figures

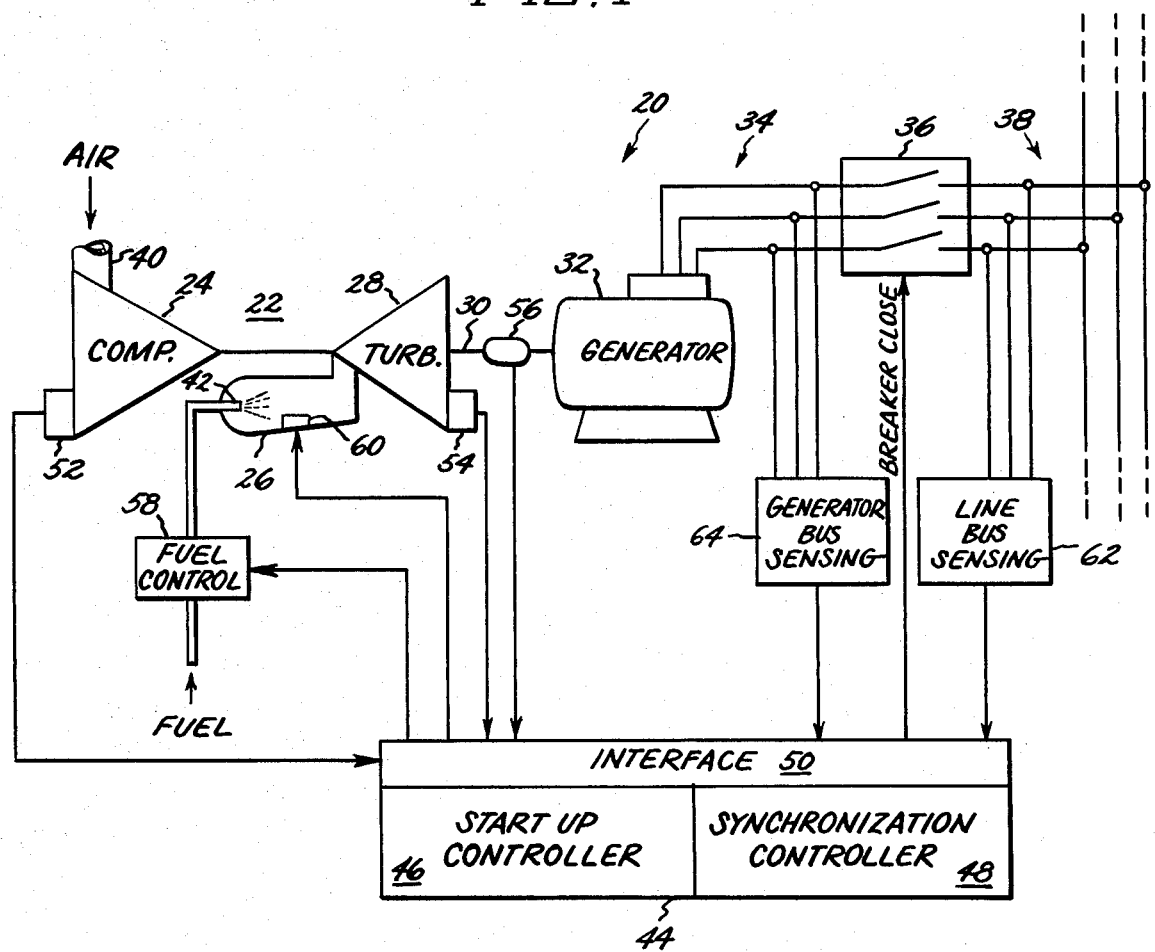
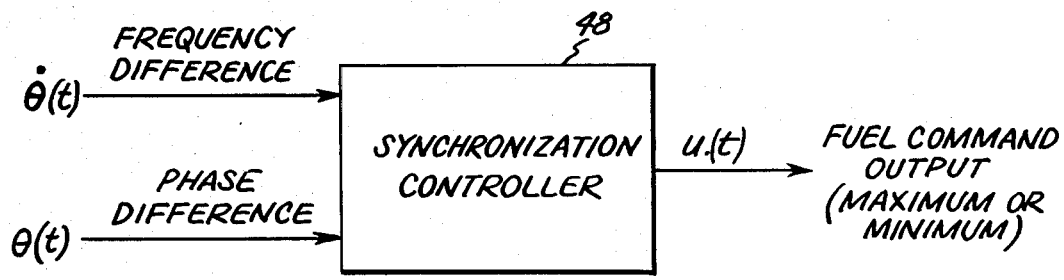

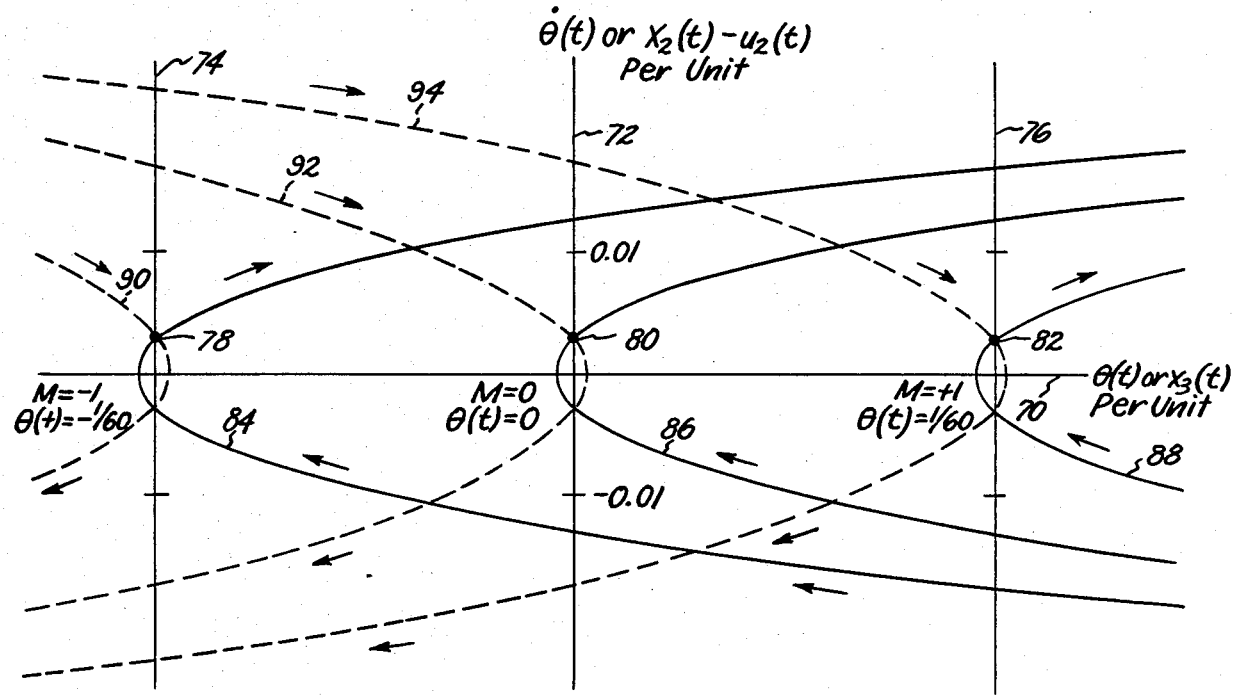
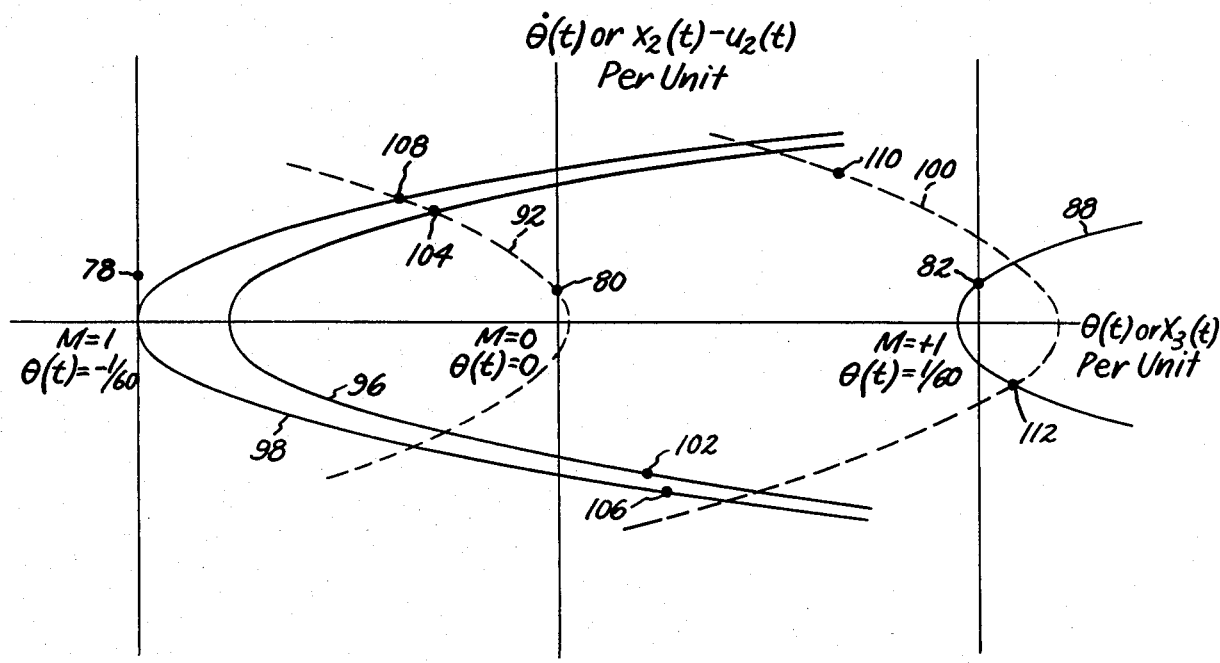

SYNCHRONIZATION FUEL CONTROL FOR GAS TURBINE-DRIVEN AC GENERATOR BY USE OF MAXIMUM AND MINIMUM FUEL SIGNALS

BACKGROUND OF THE INVENTION

The present invention relates generally to controls and control methods for synchronizing a gas turbine-driven AC generator to an external AC power system and, more particularly, to control methods and control systems operable following gas turbine startup to guide the gas turbine-driven generator from a speed just below synchronous speed to proper speed and phase angle for synchronization in minimal time, with minimal fuel expenditure, and with minimal thermal stress on the gas turbine.

It is well known that if the phases and frequencies of a generator and an AC power system are not closely matched at the time a circuit breaker closes to connect the generator to the electrical power system, very large transfers of energy occur between the electrical power system and the generator. The resulting high electric current may damage the stator windings of the generator. Moreover, the accompanying transient torque on the generator shaft may reach values up to twenty times the design torque and cause failure of the shaft. Further, the stability of the external power system itself can be adversely affected. Thus, it is necessary for the generator to be synchronized to the power system before the generator is connected to the power system.

Particularly for a gas turbine-driven generator, it is also important that a minimal amount of time be taken to synchronize the generator to the power system. Gas turbine power plants are most often used to meet peak load demands in a power system. For this reason, they are started and stopped often. The amount of time required to start a gas turbine, synchronize it to the power system, and fully load it is important to power system operators and dispatchers. A fast starting gas turbine power plant allows quick response in emergency conditions in a power system, and keeps down operating costs.

It has long been desired to decrease the severity of the temperature cycle of the hot-gas-path parts of a gas turbine during start up. The gas turbine hot-gas-path temperature increases steadily as it is driven by its starting means and then starts to accelerate under its own power. As turbine speed increases, its efficiency increases, its acceleration increases, and the hot-gas-path temperature drops. With a turbine-generator power plant, it has been necessary to limit turbine acceleration, bringing it to zero (holding constant speed) as synchronous speed is reached, and then holding synchronization speed until the generator is synchronized to the power system. This results in a further drop in the hot-gas-path temperature. Once synchronism is increased, the generator picks up electrical load, and the turbine hot-gas-path temperature climbs once again.

It is desirable to synchronize a gas turbine-driven generator without having to hold synchronous speed, although this desire is not realized in conventional synchronizers. When realized, advantageously the acceleration limit during startup can be increased, the drop in the hot-gas-path temperature is less severe, and the generator can quickly pick up load.

At this point, it is important to note the distinction between gas turbine startup controllers and gas turbine synchronization controllers with which the present invention is concerned, although both types may well be combined in a single comprehensive control system. The function of a startup controller is to properly sequence and operate the gas turbine from an at-rest condition up to approximately 95% of synchronous speed. A startup controller typically sequences the gas turbine through stages of initial cranking, applying fuel and ignition when firing speed is reached, and thereafter allowing the gas turbine to accelerate while closely monitoring turbine operating parameters to accelerate the turbine as fast as possible without damage. It is particularly important to control the rate of temperature rise of turbine hot gas path parts so as to minimize undue stress. The startup controller relinquishes control to the separate synchronization controller when the gas turbine-driven generator is operating at nearly synchronous speed, for example, 95% of synchronous speed. An example of an analog-type gas turbine control system including a startup controller is disclosed in commonly-assigned Loft et al U.S. Pat. No. 3,520,133. Various startup controllers employing digital computers have more recently been proposed with the same ultimate function, namely, to accelerate the gas turbine-driven generator up to near synchronous speed.

The actual synchronization is an entirely separate process. Traditionally, synchronization has been accomplished manually by a skilled operator employing a synchroscope or similar device which provides a visual indication of the phase difference and slip (frequency difference) between the generator and the power system. The operator makes manual corrections to raise or lower the speed set point as required. When the generator ultimately reaches a point of synchronization with the power system, the operator initiates a signal to close the circuit breaker. Since it takes a finite time for a circuit breaker to actually close due to mechanical inertia, a skilled operator anticipates the breaker closing time.

More recently, various forms of automatic synchronization controllers have been proposed. In general, these synchronization controllers take the place of a skilled operator and issue raise and lower commands as is appropriate to bring the generator into synchronization with the power system. The "raise" and "lower" commands are effective, respectively, to raise and lower the speed set point or target speed at which the gas turbine controller is attempting to maintain the gas turbine. By way of example, the following two commonly-assigned U.S. patents are identified for their disclosures of synchronization controllers which issue commands to "raise" or "lower" speed for the purpose of synchronizing a generator to a power system: Konrad Pat. No. 3,801,796 and Kleba et al Pat. No. 4,249,088. Other examples of such synchronizers are disclosed in the patents to Rubner et al No. 3,562,545, Schlicher et al No. 3,794,846, Reed No. 4,031,407 and Barrett et al No. 4,118,635.

Another form of synchronization controller is disclosed in Haley U.S. Pat. No. 3,892,978. Haley proposes a synchronization controller which operates following initial turbine acceleration beginning at an initializing point when a predetermined angular velocity has been reached. At this point, the Haley controller calculates what value of constant acceleration will cause the turbine and generator to be guided to an appropriate synchronization point, and then adjusts the fuel flow of the gas turbine to a rate which should result in the calculated constant acceleration.

In this connection, it may be noted that, at or near synchronous speed of a gas turbine-driven generator, fuel flow and acceleration are approximately directly related, although rotational velocity is also a factor. Thus, a constant rate of acceleration requires essentially a constant rate of fuel flow.

During turbine startup operations subsequent to the ignition stage, but prior to breaker closure, fuel flow is modulated in a range between a minimum startup fuel flow and a maximum startup fuel flow. The minimum fuel flow is the approximate minimum required to sustain gas turbine operation without flame-out. A typical value of minimum startup fuel flow is 23% of maximum capacity fuel flow. The maximum startup fuel flow is selected in view of turbine characteristics and in view of the requirement to supply sufficient power to accelerate the turbine, but without requiring the turbine to actually supply any significant amount of power to the power system. The maximum startup fuel flow in some cases is not directly specified, but rather, follows as a function of an acceleration limit or as a function of a rate of temperature rise limit. The maximum startup fuel flow may, for example, be 38% of maximum capacity fuel flow.

Ideally, circuit breaker closure upon synchronization occurs when generator speed is slightly in excess of power system frequency such that, upon breaker closure, power flow is slightly positive. I.e., the generator goes on-line supplying power at approximately 5% of rated capacity. Thereafter, fuel flow to the turbine is increased beyond the maximum startup fuel flow rate, and the gas turbine-driven generator is allowed to gradually assume more load consistent with avoiding undue thermal stress. Optimally, generator frequency at the moment of breaker closure is within the range of from 0.2% to 0.5% greater than the power system frequency, with a phase difference of 0°.

In the art of synchronizing oncoming generators to power systems, the instantaneous operating points of the generator are plotted on a phase-frequency difference plane wherein the X or horizontal axis represents phase difference between the generator voltage and the power system voltage, and the Y or vertical axis represents frequency difference (known as slip) between the generator voltage and the power system voltage. During the synchronization process, a trajectory can be plotted in the phase-frequency difference plane, providing a convenient mechanism for visualization. For constant values of acceleration, trajectories approximate parabolas opening either to the left or to the right. For a positive value of acceleration, the resultant parabola opens up to the right. For a negative value of acceleration (i.e. deceleration), the parabola opens to the left.

Optimal synchronization points may be readily defined on the phase-frequency difference plane, and an analysis of the predicted or actual generator trajectory may then be made to determine or cause the trajectory to pass through or sufficiently near an optimal synchronization point.

SUMMARY OF THE INVENTION

Accordingly, it is an object of the invention to provide a control and methods of control for synchronizing a gas turbine-driven generator to a power system in a manner which minimizes temperature stress and fatigue of gas turbine hot gas path parts, which minimizes fuel consumption, and which minimizes the time required for synchronization.

It is a further object of the invention to provide such a controller which is realizable with a minimum of complexity, and which is compatible with either analog or digital control techniques.

It is yet another object of the invention to provide such a synchronization controller which may be incorporated in an overall gas turbine control system as one portion thereof.

It is yet another object of the invention to provide a synchronization control system which is readily adaptable to a variety of various specific gas turbine-driven generators with little effort required to adapt the synchronization controller to the dynamics of the particular gas turbine-driven generator.

Briefly, and in accordance with an overall concept of the invention, it is recognized that optimal time control principles, such as are represented by Pontryagin's minimum principle, may advantageously be applied to synchronization control of a gas turbine-driven generator.

In accordance with the invention, based on optimal time control theory, the gas turbine-driven generator can be guided from any particular initial point to an appropriate synchronization point in the minimal amount of time by employing only two fuel commands, a desired maximum and a desired minimum, without any intermediate value of fuel command. There is no need for the synchronization control to maintain synchronous speed, as breaker closure occurs when a synchronization point is reached. The desired maximum synchronization fuel command is selected in view of the characteristics of the particular turbine to minimize thermal stress, and preferably is the fuel command being called for by the startup controller at the instant the turbine is turned over to the synchronization controller. This fuel command being called for by the startup controller may, for example, be the maximum startup fuel command, may be the fuel flow resulting from an imposed acceleration limit, or may be the fuel flow resulting from an imposed rate of temperature rise limit. The desired minimum synchronization fuel command is also selected in view of the characteristics of the particular turbine, and typically corresponds to the approximate minimum fuel flow required to sustain gas turbine operation without flameout.

In accordance with the invention, an optimum synchronization point is calculated or determined from among the varous possible synchronization points and the gas turbine-driven generator is driven to this particular point in minimal time. Selection of the optimum point takes into account not only the minimum time, but also considerations of minimizing thermal stress on the gas turbine hot gas path parts. In particular, it is known that rapidly changing the fuel command to a gas turbine can cause temperature cycling of the hot-gas path components and cause fatigue. Such temperature cycling of the gas path parts can be minimized if the correct point is picked for synchronization.

It is recognized that when the startup controller releases control of the gas turbine to the synchronization controller, the startup controller normally is calling for a fuel flow corresponding to an acceleration or similar limit. In accordance with the invention, this fuel flow rate is established as the maximum synchronization fuel command and is maintained during the synchronization process as long as is possible, driving the generator on an upward and rightwardly-opening parabolic trajectory in phase-frequency difference space. Unless the operating point at which the synchronization takes over by coincidence happens to lie on a maximum acceleration trajectory which intersects an appropriate synchronization point, the actual trajectory carries the rotational velocity, and thus generator frequency, slightly higher than that which is desired for synchronization. At the appropriate instant, the controller issues a minimum fuel command, driving the generator on a selected deceleration trajectory which intersects an optimum synchronization point.

In accordance with the invention, the switching points are selected such that the minimum fuel command is never issued for longer than a predetermined maximum time duration calculated to minimize temperature stress on the gas turbine. In particular, it has been determined that if the fuel command changes from its maximum value to its minimum value and back to its maximum value, no temperature cycling of the gas turbine hot-gas path parts occurs if the time duration for which the minimum fuel command is output is not more than one second. This is due to the fact that the thermal time constants for the hot-gas path parts are much longer than one second when the turbine speed is nearly 100% of synchronous speed.

In accordance with a more particular aspect of the invention, an automatic synchronization fuel control for guiding a gas turbine-driven AC generator into synchronization with an AC power system includes elements for determining instantaneous frequency difference and instantaneous phase difference between power system voltage and the generator output voltage. The synchronization fuel control further includes a fuel control output for providing either a signal commanding a desired minimum synchronization fuel flow to the gas turbine or a signal commanding a desired maximum synchronization fuel flow to the gas turbine, the desired minimum and maximum synchronization fuel flows being as described above. Depending upon whether the controller is implemented employing analog or digital techniques, the controller includes a control element for either continuously or repeatedly comparing instantaneous frequency difference and instantaneous phase difference in accordance with predetermined functions to determine whether to output the minium fuel flow command signal or the maximum fuel flow command signal. The predetermined functions are selected so as to guide the gas turbine-driven generator to a synchronization point at which a predetermined frequency difference and a predetermined phase difference exist. Presented hereinafter is a detailed example showing the manner in which these predetermined functions are selected.

These predetermined functions are selected so as to guide the gas turbine-driven generator to a synchronization point in minimum time consistent with minimum temperature stress on the gas turbine and, accordingly, never cause the minimum fuel command to be output for longer than a predetermined maximum time, for example, one second. The predetermined functions are selected such that, during a normal gas turbine-driven generator startup, the control element initially commands the desired maximum fuel flow, and thereafter switches to the desired maximum fuel flow command a maximum of one time.

In accordance with another aspect of the invention, a method for guiding a gas turbine-driven AC generator into synchronization with an AC power system includes the steps of either continuously or repeatedly (depending on whether analog or digital computer techniques are employed) determining instantaneous frequency difference and instantaneous phase difference between power system voltage and generator output voltage.

A further step is either repeatedly or continuously comparing instantaneous frequency difference and instantaneous phase difference in accordance with predetermined functions to determine whether to command a desired minimum fuel flow to the gas turbine or to command a desired maximum fuel flow to the gas turbine, the desired minimum and maximum fuel flows being as summarized above.

The predetermined functions, again, are selected so as to guide the gas turbine-driven generator to a synchronization point at which a predetermined frequency difference and a predetermined phase difference exists. Finally, either minimum or maximum fuel flow is commanded depending upon results of comparison.

The subject synchronization controller operates effectively in all regions of the phase-frequency difference plane, regardless of whether generator frequency is above or below power line frequency, and regardless of the particular phase difference or the particular frequency difference when the synchronization process begins. As a result, if for any reason the circuit breaker fails to close and place the generator on-line, the turbine and generator are repeatedly driven back to appropriate synchronization points in an optimal manner employing only minimum and maximum fuel commands, and never intermediate fuel commands.

Further, the subject synchronization controller permits synchronization points to be characterized by any particular phase and frequency difference considered desirable in a particular system. The example employed herein characterizes synchronization points as having a 0° phase difference, and a frequency difference of +0.2%.

The present invention is not directed to the means for issuing a command to actually close the circuit breaker, as many suitable devices, such as synchronism check relays, are known. Advantageously, the subject synchronization fuel control is employed in combination with the system described in the above-identified commonly-assigned Kleba et al U.S. Pat. No. 4,249,088 for issuing a breaker close command. In the Kleba et al system, phase and frequency difference are monitored. Taking into account the time delay for a breaker close command to actually be executed due to mechanical inertia (e.g., 0.1 second), the Kleba et al system anticipates or predicts what the phase and frequency difference will be at the actual moment of contact closure, and issues a breaker close command suitably in advance. In this particular combination of the subject synchronization fuel control and the Kleba et al system for issuing a breaker close command, the Kleba et al speed matching circuits, also disclosed, are not employed.

In addition to serving well its intended function, the subject synchronization fuel control has a number of advantages relating to ease of actual implementation. Significantly, the only control inputs required are phase difference and frequency difference. An acceleration input is not required, which in practice is difficult to determine on an instantaneous basis. When implemented in a digital computer, only a few multiplications and other arithmetic operations are required to be performed in real time at each sampling point, which is well within the capacity of an eight-bit microcomputer serving other system functions as well. As a further advantage, the subject invention can be employed to drive a turbine generator to synchronizing points defined by any particular values of phase and frequency difference, as those disclosed herein are exemplary only. Yet another advantage is a recovery procedure in the event the circuit breaker fails to close when a synchronization point is reached. The subject synchronization fuel control drives the turbine-generator back to the desired phase and frequency difference for synchronization, and continues to do so in a manner which minimizes time, fuel and turbine thermal stress until the circuit breaker closes. A related advantage is the subject synchronizer operates from initial points anywhere within the operating range, and is not limited, for example, to initial points characterized by a particular speed.

It should be noted that aspects of the present invention have been described in literature made available to the public less than one year prior to the filing date hereof. Specifically, aspects of the invention are described in a thesis by Timothy P. Near entitled "A Gas Turbine-Driven Generator Synchronizer" submitted to the Graduate Faculty of Rensselaer Polytechnic Institute in partial fulfillment of the requirements for the degree of Master of Engineering, Rensselaer Polytechnic Institute, Troy, N.Y., May 1981.

BRIEF DESCRIPTION OF THE DRAWINGS

While the novel features of the invention are set forth with particularity in the appended claims, the invention, both as to organization and content, will be better understood and appreciated from the following detailed description, taken in conjunction with the drawings, in which:

FIG. 1 is an overall block diagram of a gas turbine-driven power plant;

FIG. 2 depicts various parabolas plotted in a phase-frequency difference plane such as is conventionally employed to depict generator synchronization processes;

FIG. 3 depicts several exemplary optimum-time trajectories in the phase-frequency difference plane;

FIG. 6 is a block diagram showing the synchronization controller portion of the FIG. 1 gas turbine-driven power plant controller;

DESCRIPTION OF THE PREFERRED EMBODIMENTS

Figure 4:
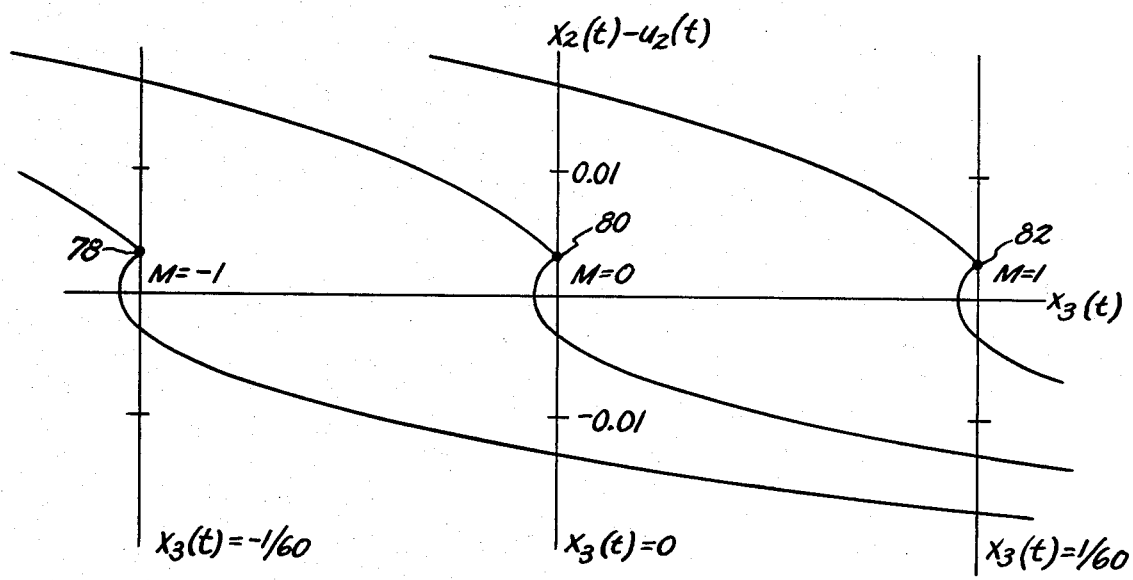
FIG. 4 depicts three switching loci for exemplary synchronization points in the phase-frequency difference plane.

Referring first to FIG. 1, a gas turbine-driven power plant 20 includes a gas turbine, generally designated 22, comprising a compressor 24, a combustion chamber 26, and a turbine 28 connected through a rotating shaft 30 to drive a load in the form of an AC generator 32. The generator 32 has an output bus or line 34 connected through a controllable circuit breaker 36 to an external power system represented by a line or power system bus 38. Air entering the compressor 24 inlet at 40 supports the combustion of fuel injected by a nozzle 42.

Operation of the power plant 20 is monitored and directed by a controller 44, depicted as comprising separate startup controller 46 and synchronization controller 48 subsystems, connected through a common interface 50 to various operational elements of power plant 20. Preferably, the controller 44 comprises a microprocessor-based system in the form of a plurality of redundant computers in a fault-tolerant system. Being a microprocessor-based system, it will be appreciated that important elements of the startup controller 46 and the synchronization controller 48 comprise programs stored in computer memory and appropriately executed by one or more central processing units (not shown). As is known, a microprocessor-based controller such as the controller 44 comprises essentially a digital computer communicating with the controlled devices connected to a plurality of input and output ports or lines via appropriate interfacing circuitry comprising various sensors, actuators, analog-to-digital converters, digital-to-analog converters and the like.

The controller 44 is connected to various sensors of the gas turbine 22, such as representative sensors 52, 54 and 56 to monitor various important operating parameters such as temperature, pressure, rotational velocity, flame presence, and acceleration. The controller 44 outputs signals to operational elements of the gas turbine 22, such as a fuel control 58 and an igniter 60. The present invention is not particularly concerned with the specific details of starting and operating a gas turbine such as a gas turbine 22, the general principles of which are well known to those skilled in the art. Further details of operation of a gas turbine, as well as necessary functions to be performed by the startup controller 46, may be had by reference to the above-identified commonly-assigned Loft et al U.S. Pat. No. 3,520,133.

The controller 44 also receives information from the generator 32 and power system bus 38, and issues commands to the circuit breaker 36. More particularly, a output generator bus sensor 64 and a power system bus sensor 62 are respectively connected to the generator output bus 34 and the power system bus 38 to determine the frequency and relative phase angle of each in order that the output frequency and phase angle of the generator 32 may be matched to that of the power system bus 38 prior to the closure of the circuit breaker 36 upon issuance of a breaker close signal from the controller 44.

For synchronization purposes, there are ultimately two essential quantities which must be known, instantaneous frequency difference and instantaneous phase difference between the sinusoidal voltage wave forms on the generator output bus 34 and the power system bus 38. There are a variety of known ways to obtain these parameters, and the present invention is not limited to any particular technique. Both the generator output bus 34 and the power system 38 must be sensed, and their difference obtained at some point. The difference may be obtained immediately upon sensing, or parameters relating to generator and power system frequency and phase may be separately processed, and their difference obtained at another point. Further, various methods for sensing frequency and phase are known, and the invention is not limited to any particular such method. Moreover, it is not even necessary to directly sense both frequency and phase. For example, since frequency difference is the first derivative of phase difference, it is sufficient to sense phase difference alone, and obtain frequency difference by differentiation.

With reference now to FIG. 2, there are depicted various points and curves in a phase-frequency difference plane such as is conventionally employed to depict generator synchronization processes. In FIG. 2, the horizontal axis 70 represents the difference in phase $\theta(t)$ of the gas turbine-driven generator 32, and the vertical axis 72 represents the frequency difference $\dot{\theta}(t)$. By convention, the frequency difference is positive when the generator 32 frequency is higher than the power system bus 38 frequency, and the phase difference is positive when the generator 32 phase leads power system bus 38 phase. The frequency and phase differences are expressed in per unit (P.U.). On a 60 Hz power system, a frequency of one per unit is equal to 60 Hz, and a one-cycle phase difference (360° or $2\pi$ radians) is equal to 1/60 per unit. Since the generator 32 and the power system bus 38 voltage wave forms are in phase whenever the phase difference is an integer multiple of 360° or $2\pi$ radians, additional vertical axes 74 and 76 are drawn at $-1/60$ per unit and $+1/60$ per unit corresponding respectively to a phase difference of $-2\pi$ radians in a phase difference of $+2\pi$ radians. These integer multiples are also designated in terms of an integer variable M, shown for purposes of example at $M=-1$, $M=0$, and $M=+1$.

The horizontal 70 and vertical axes 72 are also labeled respectively $x_3(t)$ and $x_2(t)-u_2(t)$ which correspond to variable names, described in detail hereinafter with reference to FIGS. 9–11, assigned to various parameters of an operating turbine-generator system.

Depicted on the phase-frequency difference plane of FIG. 2 are three representative optimal synchronization points 78, 80 and 82 corresponding to the optimal phase and frequency difference values at the instant of circuit breaker 36 closure to place the generator 32 on line. An optimal synchronizing point is generally considered to be one with a frequency difference of 0.002 per unit (0.12 Hz on a 60 Hz system). The generator is thus slightly faster than synchronous speed such that, at the instant of breaker closure, a slight amount of energy, for example 5% of total generator capacity, flows from the generator 32 to the power system bus 38. At an optimal synchronizing point, the phase difference is 0°. In the phase-frequency difference plane of FIG. 2, it will be appreciated that there are an essentially infinite number of synchronizing points, since the generator 32 and power system 38 are again in phase every time their phase difference becomes $2\pi$ radians or 360°. Thus, the points 78, 80 and 82 are representative only for values of $M=-1$, $M=0$ and $M=+1$.

While the points 78, 80 and 82 are optimal synchronization points, in actual practice there is a region of acceptable synchronizing points centered around each of the optimal synchronization points 78, 80 and 82 within which regions the generator 32 may be connected to the power system bus 38 without damage to the generator and without adversely affecting the stability of the power system bus 38. While not specifically shown in FIG. 2, each acceptable synchronization region when plotted on the phase-frequency difference plane is shaped as a diamond centered on an optimal synchronization point. The extremes of allowable phase difference are 10° in either direction, and the extremes of allowable frequency difference range from $-0.001$ per unit ($-0.06$ Hz on a 60 Hz power system) to $+0.005$ per unit ($+0.30$ Hz on a 60 Hz power system). Reference may be had to the above-identified commonly-assigned Kleba et al U.S. Pat. No. 4,249,088 for a depiction and description of a diamond shaped region acceptable for synchronization.

Expressed in mathematical terms, the generator 32 and the power system bus 38 are in phase whenever $$\theta_d(t) = 2\pi M \text{ radians}$$

where $M = \ldots, -2, -1, 0, 1, 2, \ldots$, and
$\theta_d(t)$ is the phase difference of the generator 32 and power system 38.

Any synchronizing point is defined as $$x_d^T = (\dot{\theta}_d(t), \theta_d(t)) = (0.002, 2\pi M),$$

where $\theta_d(t)$ is the phase difference of the generator 32 and power system 38,
$\dot{\theta}_d(t)$ is the frequency difference (expressed in per unit), and
$M = \ldots, -2, -1, 0, 1, 2, \ldots$.

In the nomenclature employed above, the subscript "d" indicted that x is a column matrix (or vector), and the superscript "T" indicates that, for convenience, the column matrix has been transposed and written as a row.

Also depicted on the phase-frequency difference plane of FIG. 2 are various parabolic trajectories which occur as the generator 32 is accelerated and decelerated and its frequency and phase angle thus vary as a function of time with respect to the frequency and phase angle of the power system bus 38. Specifically, shown in solid lines are three representative constant acceleration trajectories 84, 86 and 88 passing respectively through the optimal synchronization points 78, 80 and 82. These parabolic trajectories 84, 86 and 88 open to the right since, as a turbine is accelerated from below synchronous speed through synchronous speed, phase difference decreases until synchronous speed is reached (zero frequency difference), and then phase difference increases.

Depicted in dash lines are three representative constant deceleration trajectories 90, 92 and 94 passing respectively through the optimal synchronization points 78, 80 and 82. These occur as the gas turbine-driven generator 32 is decelerated from above synchronous speed through synchronous speed.

For constant-rate acceleration and constant-rate deceleration, the trajectories follow the parabolic curves as depicted. Near synchronous speed, the rate of acceleration is nearly constant for any given fuel flow, and thus the constant acceleration trajectories 84, 86 and 88 may be viewed as possible trajectories for one given rate of fuel flow, for example a maximum desired fuel flow during synchronization. The constant deceleration trajectories 90, 92 and 94 may be considered as representative of trajectories which occur for another given rate of fuel flow, for example a minimum value of fuel flow just sufficient to sustain gas turbine operation without flame-out, as described hereinabove.

It is important to note that, even with a constant rate of fuel flow and thus a substantially constant rate of acceleration, there are an infinite number of possible trajectories which may be drawn between each pair of the trajectories actually depicted in FIG. 2. While all possible trajectories are parabolas, they may be positioned anywhere along the horizontal axis, the position of any particular constant acceleration or constant deceleration trajectory depending upon the initial point. The particular parabolic trajectories depicted in FIG. 2 are those which happen to pass through the optimal synchronization points 78, 80 and 82. Gas turbine-driven generator trajectories may also be drawn, for the same rates of acceleration and fuel flow, which do not pass through the optimum synchronization points 78, 80 and 82.

Application of Minimal Time Control Theory

From optimal time control theory, given a control system with amplitude constraints (i.e., limited values of acceleration and deceleration permissible), in order to complete a path in phase-frequency difference space from one point to another in minimal time, the amplitude of the driving force should at all times be maximized at one extreme or the other, and should switch at most only once between these two extremes. For example, see L. S. Pontryagin, V. G. Boltyanskii, R. V. Gamkrelidze, and E. F. Mischenko, *The Mathematical Theory of Optimal Processes*, Wiley (Interscience), New York, 1962.

In the context of a gas turbine-driven generator, to drive the generator 32 from any initial point in the phase-frequency difference plane (i.e. from a point at which the turbine startup controller relinquishes control) to a given optimal synchronization point in minimum time requires that only a maximum value of acceleration and a maximum value of deceleration be employed (corresponding to desired maximum and desired minimum fuel flow, with no intermediate values of acceleration or fuel flow). For typical synchronization, the gas turbine-driven generator should first be driven at maximum acceleration and then, at an appropriate point, be switched to maximum deceleration until the selected synchronization point is reached.

Practical application of minimal time control theory to synchronization of a gas turbine-driven generator involves a number of considerations which are recognized and resolved in accordance with the subject invention. Important considerations are involved in selecting the proper optimal synchronization point in view of the many which are possible optimal, for example the possible synchronization points 78, 80, and 82 of FIG. 2. Another particularly important consideration is minimizing the thermal stress on the hot-gas-path parts of the gas turbine 22 in order to ensure long-term reliability. Yet another consideration involves the manner in which optimal time control theory can be implemented without undue complexity and involving minimal computation such that the proper fuel command can be determined in real time at the outset of and throughout the synchronization process.

With reference to FIG. 3, there are shown for purposes of example, several optimum-time trajectories on a phase-frequency difference plane from given initial points to selected ones of the optimal synchronization points 78, 80 and 82. The plots of FIG. 3 include one constant deceleration trajectory repeated from FIG. 2 passing through an optimal synchronization point, specifically the constant deceleration trajectory 92 passing through the optimal synchronization point 80, and additionally one constant acceleration trajectory repeated from FIG. 2 passing through an optimal synchronization point, specifically the constant acceleration trajectory 88 passing through the optimal synchronization point 82. Additionally shown for purposes of example are two constant acceleration trajectories 96 and 98 which do not pass through any synchronization point, and a constant deceleration trajectory 100 which likewise does not pass through any synchronization point.

Considering for purposes of example an initial point 102 lying on constant acceleration trajectory 96, in order to reach the optimal synchronization point 80 in optimal time, the proper solution is to provide maximum turbine acceleration (i.e. desired maximum fuel flow), following the constant acceleration trajectory 96 upwardly until point 104 is reached. Point 104 is defined at the intersection of constant acceleration trajectory 96 and constant deceleration trajectory 92, which trajectory 92 intersects the optimal synchronization point 80. At point 104, to continue the minimum time solution, the turbine control should switch to maximum deceleration, i.e. desired minimum fuel flow so as to follow the constant deceleration trajectory 92 until the optimal synchronization point 80 is reached, at which point the generator 32 may be connected to the power system bus 38.

As another example, if the initial point is point 106 along the constant acceleration trajectory 98, then the minimum time path to reach optimal synchronization point 80 is along the constant acceleration trajectory 8 up to point 108 at the intersection of constant deceleration trajectory 92, at which point 108 the turbine should switch to maximum deceleration in order to follow the trajectory to the optimal synchronization point 80.

These two examples, beginning at points 102 and 106, are typical for a normal synchronization wherein the gas turbine-driven generator is driven on a minimum time trajectory to reach a selected optimal synchronization point, such as the optimal synchronization point 80. Significantly, at the time the synchronization process begins, the startup controller is normally calling for maximum fuel flow, and the synchronization process continues this maximum fuel flow, requiring no change in fuel flow which potentially introduces thermal stress.

As a final example with reference to FIG. 3, the initial point 110 along the constant deceleration trajectory 100 is considered. Initial point 110 could not be considered the start of a normal synchronization inasmuch as the generator speed is above synchronous speed, but nevertheless is a point at which synchronization conceivably could begin, for example after failure to execute a breaker-close command. It is a significant feature of the present invention that the gas turbine-driven generator is optimally driven directly to a synchronization point from any point whatsoever in the frequency-phase difference plane (within operating limits). From initial point 110, the minimum time solution follows the constant deceleration trajectory 100 downwardly until point 112 at which the constant acceleration trajectory 88 is intersected. At point 112, desired maximum fuel flow is called for, until the optimal synchronization point 82 is reached.

Thus, the parabolic trajectories of FIGS. 2 and 3, and particularly those of FIG. 2, may be viewed as switching loci, since the FIG. 2 parabolic trajectories all intersect synchronization points. In other words, if the turbine is accelerating at the maximum rate and reaches a point on the upper portion (above the synchronization points) of any one of the constant deceleration trajectories 90, 92 and 94, then the control should immediately switch to maximum deceleration, i.e., minimum fuel flow. Conversely, if the gas turbine is being supplied with constant fuel flow and is following a maximum deceleration trajectory which does not itself pass through any one of the optimal synchronization points, when the constant deceleration trajectory intersects the lower portion (below the synchronization points) of any one of the constant acceleration trajectories 84, 86 and 88, the controller should then immediately switch to maximum acceleration, i.e., maximum fuel flow.

FIG. 4 depicts the switching loci for the three exemplary optimal synchronization points 78, 80 and 82. Based on the foregoing, it will be appreciated that the switching loci in FIG. 4 comprises the upper portions of the maximum deceleration (minimum fuel flow) trajectories 90, 92 and 94 of FIG. 2, and the lower portions of the maximum acceleration (maximum fuel flow) trajectories 84, 86 and 88 of FIG. 2.

It will be appreciated that the foregoing description with reference to FIGS. 2, 3 and 4 is for purposes of example only to illustrate minimum-time controller concepts, and ignores a number of important considerations in a practical system. As stated above, significant practical considerations include selecting which particular synchronization point to drive to, not only in terms of optimal time solution, but also in terms of minimizing thermal stress on the gas turbine 22. Also, the gas turbine 22 does not react instantaneously to changes in fuel valve commands. Rather, a finite fuel valve delay exists, which must be taken into account when issuing commands.

Controller Implementation

From the foregoing discussion with reference to FIGS. 2-4, it will be appreciated that for any given initial point in the phase-frequency difference plane, there exists a particular gas turbine fuel command or sequence of fuel commands appropriate to reach an optimal synchronization point in minimum time, consistent with minimizing thermal stress on the gas turbine 22. Further, the appropriate fuel commands are either for desired minimum fuel flow or for desired maximum fuel flow. Intermediate values of fuel flow are never called for in an optimal-time solution.

A practical controller, in order to be reliable, cannot make purely predictive decisions just one time based on an initial point, and expect the turbine trajectory to faithfully follow a predicted model to a synchronization point. Rather, a practical controller must either continuously or at discrete intervals verify its decision as to which particular synchronization point to drive the turbine to, and which of the two fuel flows to command. For any given point within the phase-frequency difference plane, there exists an appropriate synchronization point (characterized by a particular value of M) and an appropriate fuel flow, either maximum or minimum. Stated even more simply, for every point in the phase-frequency difference plane, there exists an appropriate fuel flow. In normal operation when a parabolic trajectory is being followed, successive operating points are along the particular trajectory, and the appropriate fuel command is the same for each point along the trajectory, until one of the switching loci, such as are illustrated in FIG. 4, is reached, at which time the appropriate fuel command changes.

Further, as is demonstrated hereinafter, the essentially infinite number of points in the phase-frequency difference plane are arranged in predefined areas or regions of the plane. Within each area or region, there is a single appropriate fuel command. As a given trajectory continues within a given region, the fuel command remains unchanged. For any particular gas turbine-driven generator, various appropriate regions in the phase-frequency difference plane can be calculated, based on which appropriate fuel commands can be determined. In any particular case, the specifics depend upon the dynamics of the turbine and generator combination, considerations of minimizing thermal stress, the particular desired maximum fuel flow and thus turbine acceleration permitted during synchronization before the generator is connected to the power system, as well as any special considerations which may be required to avoid controller instability due to gas turbine fuel valve delay and departures of mathematical models employed from the actual turbine-generator system.

Presented next hereinbelow are specific results and two exemplary controller implementations for one particular gas turbine-driven generator. Presented hereinafter, for purposes of example, are detailed considerations in the development of the particular controller depicted. By reference to this example, those skilled in the art will readily be able to implement synchronization systems in accordance with the invention for other particular turbine-generator combinations.

Figure 5:
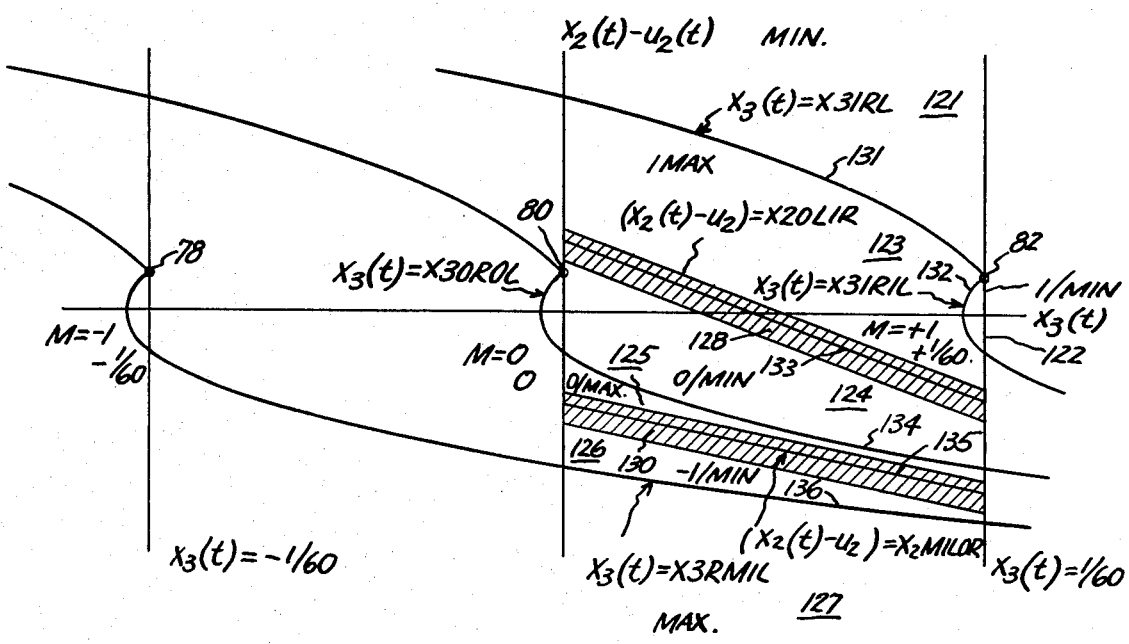
FIG. 5 is a representation, in the phase-frequency difference plane, of various regions or areas for which specific control actions are to be taken.

With reference now to FIG. 5, one example of such regions in the phase-frequency difference plane is presented. At the outset, it may be noted that since synchronization points exist every 360° (1/60 per unit), it is sufficient to define regions only within a phase difference range of 0° to 360°, or, in per unit terms, of from 0 to 1/60. If the phase difference is outside of the range 0 to 1/60, it is simply shifted into this range by adding or subtracting integer multiples of 1/60 as required.

Specifically defined in FIG. 5 are seven regions 121-127, and two controller deadbands 128 and 130. Also, for each region 121-127 are indicated the particular optimal synchronization point 78, 80 or 82 to which the gas turbine-generator should be driven, and the fuel flow, either desired maximum or desired minimum, appropriate for that particular region. The synchronization points are expressed in terms of values of M, where M is either −1, 0, or +1. The fuel command is indicated as either MIN for minimum or MAX for maximum. Thus, within the region 123, the notation 1 MAX indicates that the generator should be driven to the synchronization point 82 at which M=+1, and the appropriate fuel command is desired maximum.

Within either of the two dead band regions 128 and 130, the fuel command is unchanged from its last previous value. For the two extreme regions 121 and 127 no value of M is defined because within these regions it is not yet clear to which synchronization point, i.e. value of M, the turbine-generator should be driven.

The boundaries between the regions 121–127 are lines 131–136 defined as functions of phase difference $x_3(t)$ and the difference between the generator output frequency $x_2(t)$ and power system frequency $u_2(t)$. Each of the lines 131–136 is thus further identified by a variable name and a functional expression, as follows.

For line 131:

$$X31RL = -50(x_2(t) - u_2(t) + 0.00167589)^2 + 1/60 + 6.7222 \times 10^{-4}. \quad (1)$$

For line 132:

$$X31R1L = 100(x_2(t) - u_2(t) - 0.000837945)^2 + 1/60 - 1.3611 \times 10^{-4}. \quad (2)$$

For line 133:

$$X20L1R = -0.7313 x_3(t) + 0.004875. \quad (3)$$

For line 134:

$$X30R0L = 100(x_2(t) - u_2(t) - 0.000837945)^2 - 1.1361 \times 10^{-4}. \quad (4)$$

For line 135:

$$X2M1L0R = -0.4467 x_3(t) - 0.007664. \quad (5)$$

For line 136:

$$X3RM1L = 100(x_2(t) - u_2(t) - 0.000837945)^2 - 1/60 - 1.3611 \times 10^{-4}. \quad (6)$$

The deadbands 128 and 130 around the lines 133 and 135 (X20L1R and X2M1L0R) extend upward by 0.000837945 and downward by 0.00167589 in each case.

In the above equations or functions, it can be seen that the frequency difference is always expressed as $x_2(t) - u_2(t)$. The equations can therefore be simplified by inserting a variable name for frequency difference, but they are presented in the foregoing manner in order to be consistent with the manner in which the functions are derived, described hereinafter by way of example with reference to FIGS. 9–18.

With reference now to FIG. 6, there is shown in block diagram form the synchronization controller 48 portion of the FIG. 1 controller 44. As may be seen from FIG. 6, the synchronization controller 48 has only two inputs, frequency difference $\dot{\theta}(t)$ and phase difference $\theta(t)$, and a single fuel command output $u_1(t)$. The fuel command output calls for either desired maximum or desired minimum fuel flow.

In operation, the synchronization controller 48 either continuously or at intervals samples the frequency difference and phase difference and determines, by means of predetermined functions, within which of the FIG. 5 regions 121–127 or deadbands 128 and 130 the instantaneous operating point lies, and then outputs the appropriate fuel command. It will be appreciated that, in actual implementation, the subject controller is relatively straightforward, requiring only simple multiplications, substractions, and comparisons to evaluate the functions.

Insofar as the concepts of the present invention are concerned, the synchronization controller 48 can make its comparisons and fuel valve decisions either continuously or at discrete intervals for example, once every approximately one-tenth second.

It will further be appreciated, that the synchronization controller 48 can readily be implemented employing either digital or analog computer techniques, depending upon the nature of the overall control system 44. For digital computer implementation, the synchronization controller 48 of necessity operates repeatedly at discrete intervals. In the case of analog implementation, the synchronization controller 48 can operate either continuously, or at discrete intervals. In an analog system, the choice may well depend upon the nature of the interfacing elements (not shown) which generate the frequency difference $\dot{\theta}(t)$ and phase difference $\theta(t)$ signals.

As stated hereinabove in the "Summary of the Invention", the present invention is not directed to the means for issuing a command to actually close the circuit breaker, as many suitable devices, such as synchronism check relays, are known. Advantageously, the subject synchronization fuel control is employed in combination with the system described in the above-identified commonly-assigned Kleba et al U.S. Pat. No. 4,249,088 for issuing a breaker close command. In the Kleba et al system phase and frequency differences are monitored and their trajectory in the phase-frequency difference plane determined. Taking into account the time delay for a breaker close command to actually be executed due to mechanical inertia (e.g., 0.1 second), the Kleba et al system anticipates or predicts the future trajectory and determines what the phase and frequency difference will be at the actual moment of contact closure. A breaker close command is then issued suitably in advance. Additionally, the Kleba et al system includes specific circuitry for monitoring phase and frequency difference, and this same circuitry is advantageously employed in a combined system to supply the subject synchronization fuel control with instantaneous phase and frequency difference values. For its disclosure of circuitry for determining phase and frequency difference values and for issuing a breaker close command, the entire disclosure of Kleba et al Pat. No. 4,249,088 is incorporated by reference herein. In this particular combination of the subject synchronization fuel control and the Kleba et al system for issuing a breaker close command, the Kleba et al speed matching circuits, also disclosed, are not employed.

Described hereinbelow for purposes of example are a digital computer implementation with reference to FIG. 7, and an analog implementation with reference to FIG. 8.

Digital Computer Embodiment

Figure 7:
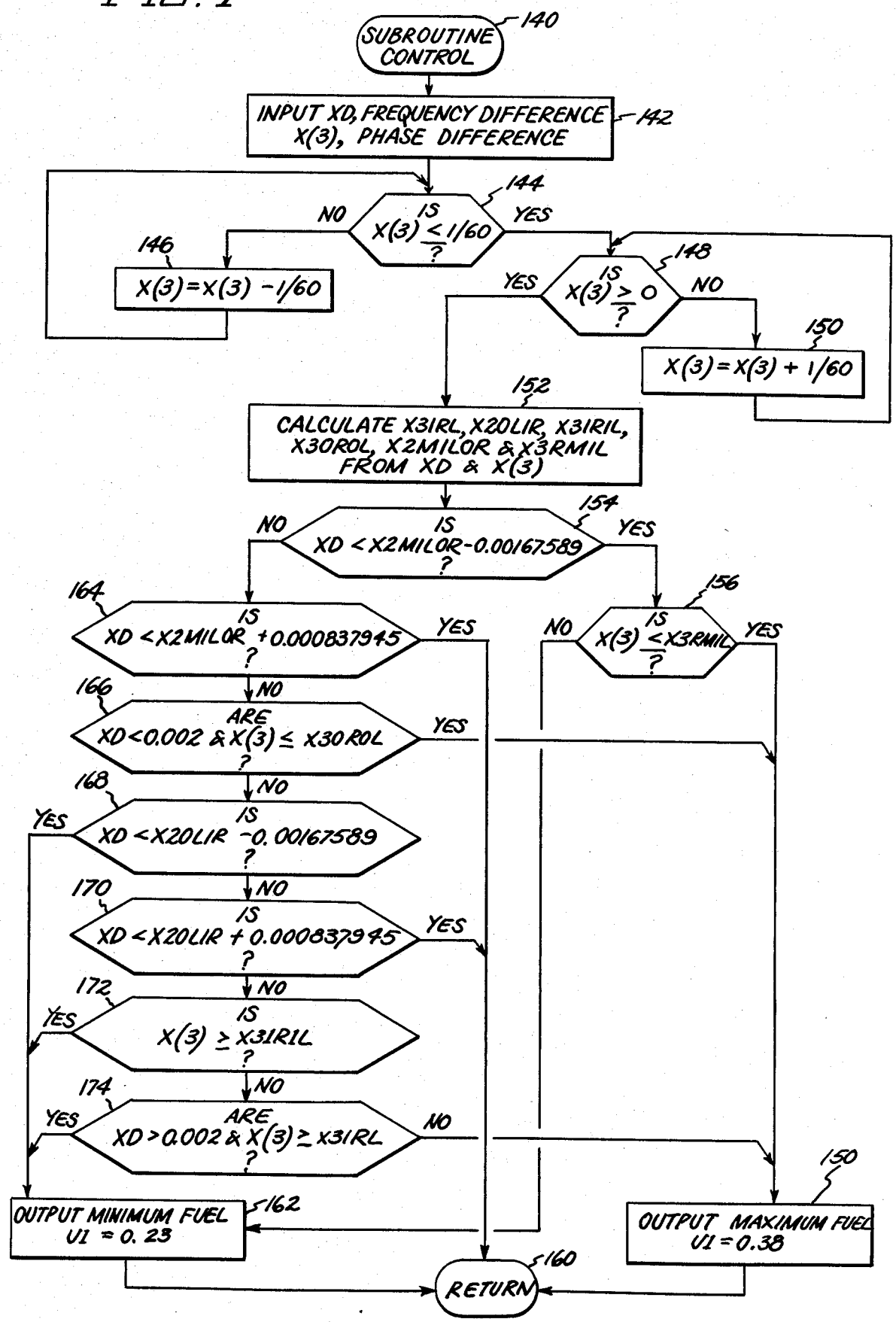
FIG. 7 is a program flow chart depicting an exemplary digital computer implementation of the FIG. 6 controller.

Considering FIG. 7, shown is a computer program flow chart of a subroutine CONTROL resident in microprocessor-program memory and repeatedly called, for example at intervals of 0.1 second, by a main program (not shown).

When called, subroutine CONTROL is entered at 140, and, in box 142, inputs the two parameters or variables it needs, XD which is frequency difference and X(3) which is phase difference. Thus, a point in the phase-frequency difference plane is defined. Insofar as the present invention is concerned, it makes no difference how frequency difference and phase difference are determined, as a variety of methods are known in the art for determining them. In a typical system, other elements of the overall FIG. 1 controller 44 provide these terms.

Next, in boxes 144, 146, 148 and 150, the phase difference parameter X(3) is shifted by adding or subtracting integer multiples of 1/60 per unit (equal to 360°) to ensure it lies within the range of from 0 to 1/60 per unit (0° to 360°).

Next, in box 152, the values of the variables X31RL, X20L1R, X31R1L, X30R0L, X2M1L0R and X3RM1L are calculated from XD and X(3) in accordance with the six equations or functional expressions listed hereinabove. As previously noted, the expression $x_2(t) - u_2(t)$ can be simplified to a single variable name, and in this example that variable name is XD.

It is readily possible to determine which region in the phase-frequency difference plane a particular point lies by recognizing that each of the variables calculated in box 152 represents the value one of the two input parameters XD or X(3) would have to be in order to lie on a given line, given the actual value of the other parameter. For example, the calculated variable X31RL is the value which X(3), phase difference, would have to have in order to lie on the FIG. 5 line 131, given the actual value of the frequency difference XD. Similarly, the calculated variable X20L1R is the value the frequency difference XD would have to have in order to lie on the line 133, given the actual value of phase difference X(3).

To perform the actual evaluation, execution of subroutine CONTROL continues with decision box 154 which determines whether the actual value of the phase difference variable XD is below the lower boundary of the deadband 130 surrounding the line 135 which is given the variable name X2M1L0R.

If the answer in box 154 is yes, then a further decision step in 156 asks whether the phase difference X(3) is to the left of (or on) or to the right of the line 136, represented by the variable X3RM1L. If the answer is yes, then program execution jumps to box 158 which sets a fuel flow variable U1 equal to 0.38, which corresponds to the desired maximum fuel command.

Execution then goes to return box 160, and returns to the calling program (not shown).

If the answer in box 156 is no, then the operating point must lie in the FIG. 5 region 126, and program execution jumps to box 162 which sets the fuel flow variable U1 equal to 0.23, which corresponds to the minimum fuel command.

Going back to decision box 154, if the answer there is no, then it is known that frequency difference XD is at least above the lower boundary of the deadband 130. Decision box 164 when asks whether XD is below the upper boundary of the deadband 130 around the line 135 which corresponds to the variable name X2M1L0R. If the answer in box 164 is yes, when execution proceeds immediately to the return box 160, and program execution resumes in the calling program (not shown), with no change in the fuel command.

If the answer in box 164 is no, then execution proceeds to box 166 which asks whether two conditions are both satisfied, i.e. the frequency difference is less than 0.002 per unit, and the value of the phase difference X(3) lies either on or to the left of the line 134, represented by the variable name X30R0L. If the answer in box 166 is yes, then the point in question lies either within the region 125 or on the line 134 corresponding to an acceleration trajectory, and execution proceeds to the box 158 to output the maximum fuel command.

If the answer in box 166 is no, execution proceeds to decision box 168 which asks whether the frequency difference is below the lower boundary of the deadband 128 around the line 133, represented by the variable named X20L1R. If the answer is yes, then the point in question lies within the region 124, and execution proceeds to box 162 to output the minimum fuel command.

If the answer in box 168 is no, then execution proceeds to decision box 170, which asks whether the actual value of the frequency difference parameter XD is below the upper boundary of the deadband 128 around the line 133. If the answer is yes, then the point in question is within the deadband 128, and program execution jumps to the return box 160, with no change in the fuel command being made.

If the answer in decision box 170 is no, then decision box 172 asks whether the phase difference X(3) is to the right of or on the line 132 which is represented by the variable name X31R1L. If the answer is yes, then the point in question lies within the small region designated 122, and execution jumps to box 162 to output the minimum fuel command.

If the answer in box 172 is no, execution proceeds finally to decision box 174 which asks whether the actual phase difference X(3) is on or to the right of the line 131 represented by the variable X31RL, and frequency difference XD is greater than 0.002 per unit. If yes, then the point in question lies in the region 121 above the line 131, and execution proceeds to box 162 to output the minimum fuel command. If the answer in box 174 is no, then the point in question lies within the region 123, and execution proceeds to box 158 to output the minimum fuel command.

Analog Implementation

Figure 8:
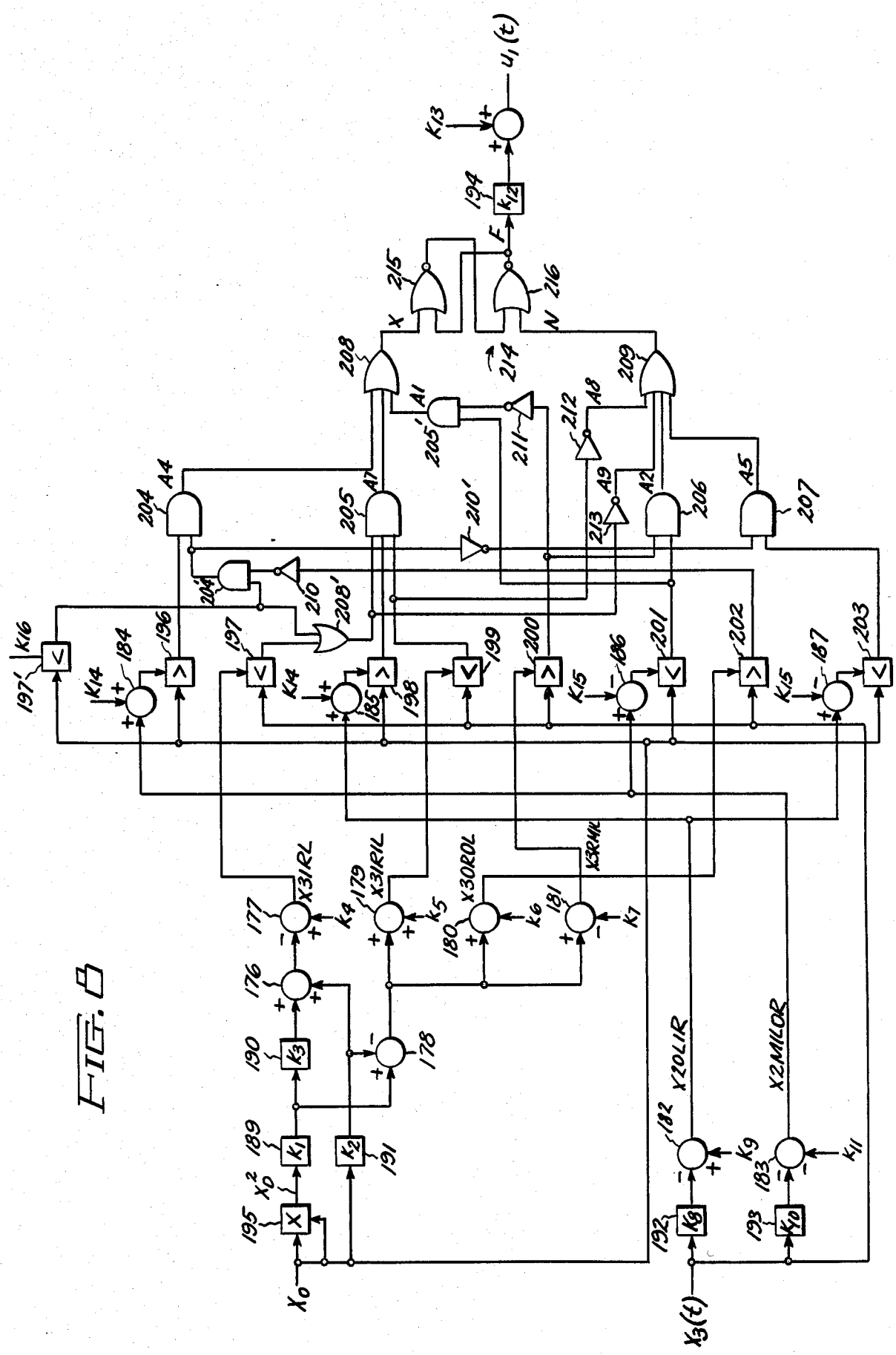
FIG. 8 is a block diagram of an analog implementation of the FIG. 6 synchronization controller.

FIG. 8 depicts in block diagram form a corresponding analog implementation of synchronization controller 48. The FIG. 8 controller has two inputs, $x_D$ and $x_3(t)$ corresponding respectively to the generator-power system frequency difference and the generator-power system phase difference. The FIG. 8 controller has a single output, $u_1(t)$, which is the gas turbine fuel command. The FIG. 8 controller continuously outputs a fuel command, $u_1(t)$ as a function of the two inputs $x_D$ and $x_3(t)$. Each instantaneous operating point on the phase-frequency difference plane may be represented by an expression of the form $(x_3(t), x_D)$.

Included within the FIG. 8 analog synchronization controller 48 are six analog signal lines labeled X31RL, X31R1L, X30R0L, X3RM1L, X20L1R and X2ML0R corresponding respectively to the FIG. 5 lines 131, 132, 134, 136, 133 and 135 in the phase-frequency difference plane. Also included within the FIG. 8 synchronization controller 48 are nine lines A1–A9, corresponding to the regions in the FIG. 5 phase-frequency difference plane. Correspondence is as indicated in the following TABLE, which also repeats the appropriate fuel command for each regions:

| Analog Variable | FIG. 5 Region | Fuel Command |
|---|---|---|
| A1 | 127 | MAX |
| A2 | 126 | MIN |
| A3 | Deadband 130 | NO CHANGE |
| A4 | 125 | MAX |
| A5 | 124 | MIN |
| A6 | Deadband 128 | NO CHANGE |
| A7 | 123 | MAX |
| A8 | 122 | MIN |
| A9 | 121 | MIN |

In the FIG. 8 synchronization controller 48, the lines A1-A9 are digital logic lines, and represent either a binary "1" (logic high) or a binary "0" (logic low) depending upon whether a particular point defined by the input parameters or variables $x_D$ and $x_3(t)$ lies in a particular one of the regions. $A_n$="1" if the point ($x_3(t)$, $x_D$) lies in the region An. $A_n$="0" if the point ($x_3(t)$, $x_D$) lies outside of the region An.

In general, the FIG. 8 synchronization controller 48 comprises a plurality of analog elements interconnected as depicted. Summing junctions 176-188 output the sum (or difference) of two input values. Amplifiers 189-194 multiply an input by a constant, indicated in the form $K_n$. A multiplier 195, which multiplies two inputs to provide an output, in FIG. 8 is connected as a squarer to provide a value of $x_D^2$. Each of these analog elements is implemented employing conventional analog techniques.

The FIG. 8 synchronization controller 48 also includes comparators 196-203 which function to compare two input analog quantities, and output either a binary "1" or "0", depending upon which of the two input quantities is greater. The comparaters 196, 198, 200 and 202 are drawn as "greater than" comparators wherein the comparison input is drawn to the left edge of the particular box, and the reference input is drawn to the upper edge of the box. If the comparison input is greater than the reference input, then the output is "1". If the comparison input is less than or equal to the reference input, then the output is "0". The comparators 197, 197', 199, 201 and 203 are drawn as "less than" comparators wherein the comparison input is drawn to the left edge of the particular box, and the reference input is drawn to the upper edge of the box. If the comparison input is less than the reference input, the output is "1". If the comparison input is greater than or equal to the reference input, then the output is "0".

Finally, the FIG. 8 synchronization controller 48 includes a number of digital logic gates which, in general, are connected to the comparator outputs. These digital logic gates include AND gates 204-207, OR gates 208, 208' and 209, inverters 210-213, and a reset-set (RS) flip-flop 214 comprising two cross-coupled NOR gates 215 and 216.

The FIG. 8 analog synchronization controller 48 employs a plurality of constants $K_1$ through $K_{16}$. These constants, as indicated, are the multiplication constants of the amplifiers 189-194, and also are inputs to selected ones of the summing junctions 176-188. It will be appreciated that the values of these constants are selected in view of the particular predetermined functions which a particular controller embodiment is to implement. For the regions in the phase-frequency difference plane depicted in FIG. 5, these constants have the following values:

TABLE OF FIG. 8 CONSTANT VALUES $K_1 = 100$
$K_2 = 0.167589$
$K_3 = 0.5$
$K_4 = 1.71984 \times 10^{-2}$
$K_5 = 1.66007 \times 10^{-2}$
$K_6 = 6.5894 \times 10^{-5}$
$K_7 = 1.67325 \times 10^{-2}$
$K_8 = 0.7313$
$K_9 = 4.875 \times 10^{-3}$
$K_{10} = 0.4467$
$K_{11} = 7.664 \times 10^{-3}$
$K_{12} = 0.15$
$K_{13} = 0.23$
$K_{14} = 8.37945 \times 10^{-4}$
$K_{15} = 1.67589 \times 10^{-3}$
$K_{16} = 0.2$ For the FIG. 8 analog synchronization controller 48 embodiment of the invention, the equations (1) through (6) given above for the FIG. 5, lines 131-136 are, for convenience in implementation, altered to be as follows:

$$X31RL = -50x_D^2 - 0.167589x_D + 1.71984 \times 10^{-2}. \quad (7)$$

$$X31R1L = 100x_D^2 - 0.167589x_D + 1.66007 \times 10^{-2}. \quad (8)$$

$$X20L1R = -0.7313x_3(t) + 4.875 \times 10^{-3}. \quad (9)$$

$$X30R01 = 100x_D^2 - 0.167589x_D - 6.5894 \times 10^{-5}. \quad (10)$$

$$X2M1L0R = -0.4467x_3(t) - 7.664 \times 10^{-3}. \quad (11)$$

$$X3RM1L = 100x_D^2 - 0.167589x_D - 1.67325 \times 10^{-2}. \quad (12)$$

Where $X_D = X_2(t) - u_2(t)$.

In the operation of the FIG. 8 embodiment, the frequency difference input variable $x_D$ is processed by one subcircuit to output intermediate values to which the other input variable, $x_3(t)$ is compared. These intermediate output values are provided on the lines X31RL, X31R1L, X30R0L and X3RM1L. Specifically, this is the circuit portion comprising summing junctions 176-181, amplifiers 189-191 and the multiplier 195 connected as a squarer.

Similarly, the phase difference input variable $x_3(t)$ is processed by another subcircuit to output values against which the input value $x_D$ is compared. Specifically, this is the subcircuit comprising summing junctions 182 and 183 and amplifiers 192 and 193 outputs signals along intermediate output lines X20L1R and X2M1L0R.

These values represented on the various intermediate output lines are appropriately compared by the comparators 196-203 with the original input values $x_D$ and $x_3(t)$. In addition, deadband constants $K_{14}$ and $K_{15}$ are introduced via summing junctions 184-187. Digital logic outputs are then provided by the comparators 196-203.

The digital logic gates 204-209 and inverters 210-213 comprise a combinatorial logic network to output the signals A1-A9, only one of which at any one time is at logic "1", indicating the particular FIG. 5 region within which the input point lies.

Lines A1, A4 and A7 are applied to inputs of the OR gate 208 which outputs a logic "1" on line X if either A1, A4 or A7 is at logic "1". Similarly, lines A2, A5, A8 and A9 are connected to inputs of the OR gate 209 which outputs a logic "1" on line N if any of the inputs A2, A5, A8 or A9 are high.

From an analysis of the FIG. 8 circuit, it can be seen that, if X="1", then the point ($x_3(t)$, $x_D$) is in a MAX (desired maximum fuel command) region of the FIG. 5 phase-frequency difference plane. If N=1, then the point ($x_3(t)$, $x_D$) is in a MIN (desired minimum fuel command) region of the FIG. 5 phase-frequency difference plane. If X="0" and N="0", then the point ($x_3(t)$, $x_D$) is in a deadband region of the FIG. 5 phase-frequency difference plane.

The output of the flip-flop 214 is F, corresponding to the fuel command. F="1" corresponds to the desired maximum fuel command, and F="0" corresponds to desired minimum fuel command. The flip-flop 214 serves to remember the last fuel command in the event one of the FIG. 5 controller deadbands 128 or 130 is entered so that the fuel command output is not changed.

In the specific operation of the flip-flop 214, when X="1" and N="0", then F becomes "1". When X="0" and N="1", then F becomes "0". When X="0" and N="0", then F does not change. When X="1" and N="1", then F becomes "0". The condition X="1" and N="1" occurs only in the event of a malfunction. Advantageously, this is a fail-safe circuit in the sense that when X="1" and N="1", F="0" and the minimum fuel command is output.

Determination of Functions in Phase-Frequency Difference Plane

From the foregoing, it will be appreciated that once functions in the phase-frequency difference plane are determined as is appropriate for a particular gas turbine and generator combination, the actual implementation of the controller of the present invention is relatively straightforward. Described now, through the use of an illustrative example, is the manner in which these functional expressions are determined for a particular gas turbine and generator combination. Further details may be had by reference to the above-incorporated Master's degree thesis by Timothy P. Near entitled "A Gas Turbine-Driven Generator Synchronizer".

In general, the process of determining the functions begins with a second or third order mathematical model of the gas turbine-driven generator system. In general, the performance of a gas turbine-driven generator at or near synchronous speed, i.e., from approximately 95% to 105% of synchronous speed, may be completely characterized by employing three model parameters, described below, which may be readily obtained in a manner well known in the control art from the performance curves of the gas turbine-driven generator. From the model, the particular synchronization points (best value of M) are determined, consistent with minimizing thermal stress on the turbine and consistent with unconditional stability of the system, and the minimum time trajectories are developed.

Gas Turbine-Driven Generator Model

It will be appreciated that the subject synchronization fuel control system and method does not, in operation, employ a model, or even integrators which are normally included in models. However, for determining the functions defining areas in the phase-frequency difference plane, a model of a gas turbine-driven generator is quite useful. Since models usually only approximate actual behavior, the functions determined based on models must be carefully tested to ensure that the actual controller does not exhibit instabilities and always drives the turbine-driven generator to a synchronization point. From the example which follows, it will be seen that the determination of the final functions involves both calculation and judgment.

Figure 9:
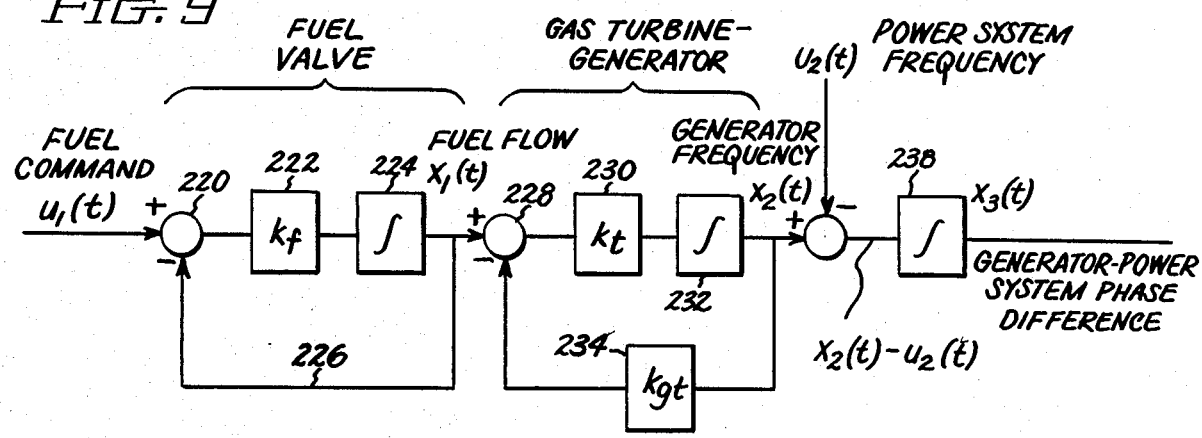
FIG. 9 is a block diagram of a third-order liquid fueled gas turbine-driven generator model useful in predetermining control functions in accordance with the invention.

As a starting point, FIG. 9 is a third-order model of a liquid fueled gas turbine-generator which is not connected to a power system but which is at operating speed. The gas turbine is considered to be at operating speed when the generator output frequency is within the range of from 0.90 to 1.05 per unit. This is acceptable as the subject synchronization controller is intended to function when the generator output frequency is within the range of from 0.95 to 1.05 per unit (from 95% to 105% of synchronous speed).

In the FIG. 9 model, an input summer 220, a constant block 222 ($k_f$), an integrator 224 and a feedback path 226 represent the turbine fuel valve portion of the model. The control input to the fuel valve is the gas turbine fuel command $u_1(t)$. The fuel valve output is fuel flow $x_1(t)$. An input summer 228, a constant block 230 ($k_t$), an integrator 232 and a feedback block 234 ($k_{gt}$) represent the gas turbine-generator portion of the model. The input to the gas turbine-generator portion is fuel flow, $x_1(t)$, and the output is generator frequency or speed, $x_2(t)$.

Since the subject synchronization fuel control controls the speed of the power plant and the phase difference between the generator output and the power system, the model must supply a phase difference term. Accordingly, a summer 236 receives the generator frequency term $x_2(t)$ and a power system frequency input term $u_2(t)$, and outputs frequency difference $x_2(t) - u_2(t)$. The frequency difference is applied to an integrator 238 which outputs phase difference $x_3(t)$.

All quantities in the FIG. 9 model are expressed in per unit. Since the control is designed for a plant on a 60 Hz power system, one per unit speed is 60 Hz. One per unit phase difference corresponds to 60 cycles or 120 radians or 21,600 degrees. The rate of fuel flow corresponding to 1 per unit depends on the gas turbine model used in the power plant. The constant $k_f$ is the reciprocal of the time constant of the gas turbine fuel valve. The constant $k_{gt}$ is the reciprocal of the unit gain of the gas turbine. The time constant of the gas turbine is $k_t k_{gt}$ and is related to the inertia of the gas turbine. Typical values of these constants are $k_f = 6$,
$k_t = 0.1$, and
$k_{gt} = 0.33$.

These three constants $k_f$, $k_t$ and $k_{gt}$ completely characterize the specific gas turbine-driven generator to which the FIG. 9 operating speed model applies. These constants can be determined from available performance curves for any particular gas turbine-driven generator.

In state space form, the operating speed model of the gas turbine-generator is $$\dot{x}(t) = Ax(t) + Bu(t)$$

where $$x(t) = \begin{bmatrix} x_1(t) \\ x_2(t) \\ x_3(t) \end{bmatrix}$$

$$\dot{x}(t) = \begin{bmatrix} \frac{d}{dt} x_1(t) \\ \frac{d}{dt} x_2(t) \\ \frac{d}{dt} x_3(t) \end{bmatrix}$$

$$A = \begin{bmatrix} -k_f & 0 & 0 \\ k_t & -k_t k_{gt} & 0 \\ 0 & 1 & 0 \end{bmatrix}$$

$$u(t) = \begin{bmatrix} u_1(t) \\ u_2(t) \end{bmatrix}, \text{ and}$$

$$B = \begin{bmatrix} k_f & 0 \\ 0 & 0 \\ 0 & -1 \end{bmatrix}$$

While the FIG. 9 turbine model is a good representation of the turbine-generator at operating speed, the minimum time optimal control solution for a third order plant is complex and not very practical to implement. See Athans and Falb, *Optimal Control*, McGraw Hill, 1966, pp. 536–551. The solution for a second order minimum time controller is easier to implement. For this reason a good second order approximation to the third order turbine-generator model is developed.

The general method employed to obtain a second order approximation of the gas turbine-generator is described in E. J. Davidson, "A Method For Simplifying Linear Dynamic Systems", *IEEE Transactions On Automatic Control*, Vol. AC-11, No. 1, January, 1966, pp. 93–101. The method approximates an nth order system described by $$\dot{x}(t) = Ax(t) + Bu(t)$$

with an mth order system (m<n) described by $$\dot{x}(t) = A^*x(t) + B^*u(t).$$

The Davidson method retains the first m eigenvalues of A and discards the remaining (n-m) eigenvalues.

Detailed steps to obtain an approximation in accordance with the Davidson method are described in detail in the above-incorporated Master's thesis by Timothy P. Near entitled "A Gas Turbine-Generator Synchronization". The approximation results are as follows:

$$A^* = \begin{bmatrix} -0.033 & 0 \\ 1 & 0 \end{bmatrix}, \text{ and}$$

$$B^* = \begin{bmatrix} 0.100553 & 0 \\ -0.0167589 & -1 \end{bmatrix}.$$

Figure 10:
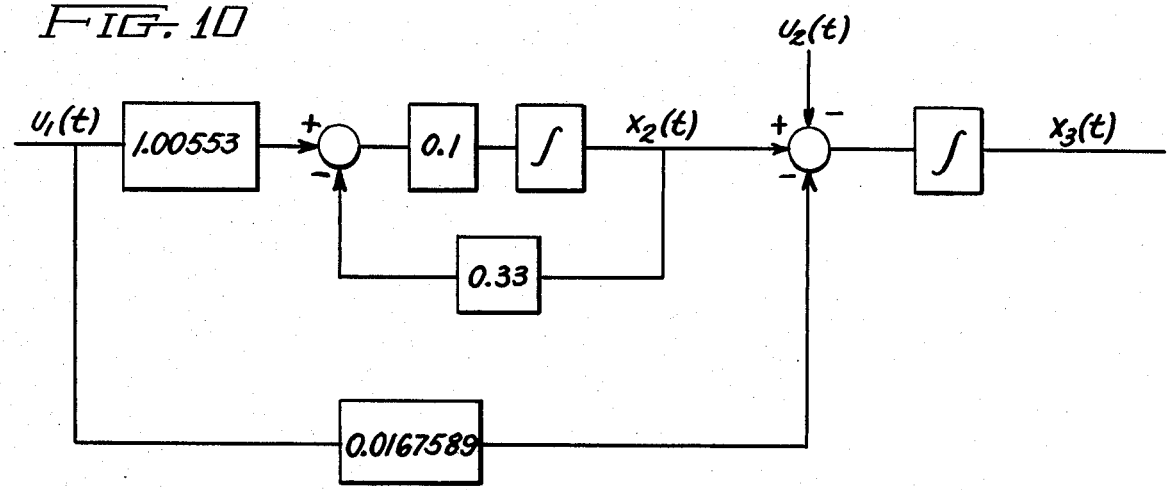
FIG. 10 is a block diagram of a second-order model approximation of the FIG. 9 model.

FIG. 10 is a block diagram of this second-order approximation of the FIG. 9 third-order model of a gas turbine-generator.

However, when the FIG. 10 model approximation was tested against the FIG. 9 model by employing a step input, the FIG. 10 model approximation proved to be not entirely satisfactory. This test is also described in the above-incorporated Master's thesis.

In particular, the values of phase difference $x_3(t)$ for a step input are very similar for both the FIG. 9 and the FIG. 10 models. However, both the transient and steady state values of generator frequency $x_2(t)$ differ significantly. The Davidson model reduction method employed yielded a good approximation of the plant output $x_3(t)$, but did not produce a good approximation of the state variable $x_2(t)$.

Figure 11:
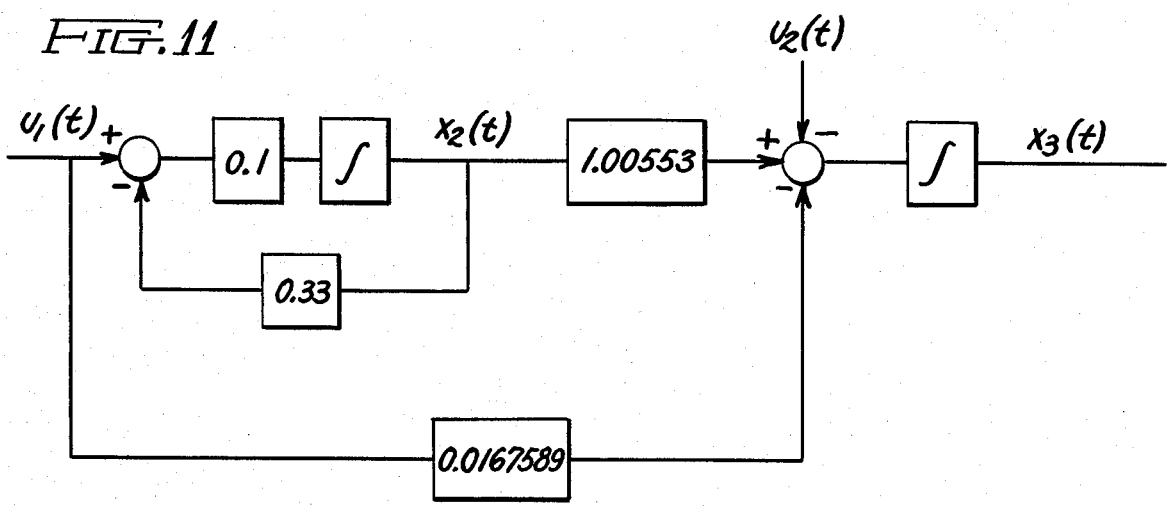
FIG. 11 is another form of second-order model approximation based on the FIG. 10 model.

A better approximation was achieved by rearranging the FIG. 10 model to obtain the model shown in FIG. 11. The transfer function for $x_3(t)$ is the same for both the FIG. 10 second order model and the FIG. 11 second order model. However, the transfer function for $x_2(t)$ is changed. The steady value of $x_2(t)$ for the second order model of FIG. 11 is the same as that for the third order turbine-generator model of FIG. 9.

Thus, the second order turbine-generator approximation used in the development of the synchronization controller fuel control in the present example is the model shown in FIG. 11. The state equations for the FIG. 11 model are $$\begin{bmatrix} \dot{x}_2(t) \\ \dot{x}_3(t) \end{bmatrix} = \begin{bmatrix} -0.033 & 0 \\ 1.00553 & 0 \end{bmatrix} \begin{bmatrix} x_2(t) \\ x_3(t) \end{bmatrix} + \begin{bmatrix} 0.1 & 0 \\ -0.0167589 & -1 \end{bmatrix} \begin{bmatrix} u_1(t) \\ u_2(t) \end{bmatrix}. \quad (13)$$

The state variables $x_2(t)$ and $x_3(t)$ are the turbine-generator speed and the generator/power system phase difference as they were for the third order model. Equation 13 above can be rewritten as $$\dot{x}(t) = \begin{bmatrix} b & 0 \\ 1 + bk_2 & 0 \end{bmatrix} x(t) + \begin{bmatrix} k & 0 \\ kk_2 & -1 \end{bmatrix} \begin{bmatrix} u_1(t) \\ u_2(t) \end{bmatrix} \quad (14)$$

where
 b = −0.033,
 k = 0.1, and
 $k_2$ = −0.167589

The input $u_2(t)$ is a quantity that the synchronization controller has no control of, the power system frequency. For this reason it is necessary to change the form of Equation (13) so that $u_2(t)$ does not appear in the control vector. Let $$x_2'(t) = x_2(t) - u_2(t) \quad (15)$$

$$x_3'(t) = x_3(t), \text{ and} \quad (16)$$

$$u(t) = u_1(t) + (b/k)u_2(t). \quad (17)$$

Substituting Equations (15), (16) and (17) into equation (14) and simplifying then yields:

$$\dot{x}'(t) = \begin{bmatrix} b & 0 \\ 1 + bk_2 & 0 \end{bmatrix} x'(t) + \begin{bmatrix} k \\ kk_2 \end{bmatrix} u(t) \quad (18)$$

where $x' = (x_2'(t), x_3'(t))$.

It will be noted that Equations (14) and (18) are quite similar. The new state variables $x_2'(t)$ and $x_3'(t)$ are the frequency difference and the phase difference respectively of the generator and the power system. The only control input is u(t). Since u(t) is a function of $u_1(t)$, the subject synchronization controller can control its value.

In summary, the form of second order gas turbine-generator approximation employed in the instant example of developing appropriate functions for the subject synchronization fuel control is that which is expressed in the Equations (15) through (18) above.

As an aside, it may be noted the Davidson method produced a good approximation of the transfer function for the plant output $x_3(t)$, but not a good approximation for the state variable "internal" to the turbine-generator model, $x_2(t)$ representing generator frequency. A better approximation of the transfer function for $x_2(t)$ might be obtained if Davison's model reduction method is employed to reduce the second order gas turbine-generator model represented by the FIG. 9 fuel valve and turbine-generator elements only (i.e., by omitting the summer 236 and integrator 238) to a first order model (not shown). The summer 236 and integrator 238 would then be added to the first order model, resulting in a different form of second order model.

Development of Control Functions

The next step is to develop the curve for a control which will drive the gas turbine-generator modeled above from a given point $(x_2(t)+0.002, 0)$ in minimum time. At this point only a single synchronizing point (where $M=0$) is being considered. It is shown hereinafter the manner in which the proper synchronizing point is selected (i.e., the best value of M).

To state the problem in mathematical terms, the control must drive the turbine to the synchronizing point $$x_d^T = (u_2(t)+0.002, 0)$$

subject to the constraints of the model, and subject to the constraint:

$$u_{1min} \leq u_1(t) \leq u_{1max}$$

where $u_{1min}$ is the desired minimum fuel command and $u_{1max}$ is the desired maximum fuel command.

As previously stated, the desired minimum amount of fuel which the synchronization controller calls for is approximately that which is required to sustain gas turbine operation without flame out. The desired maximum amount of fuel which the synchronization controller is allowed to call for is preferably the amount of fuel flow to the turbine just before the synchronization process begins. (The fuel flow after synchronization is increased above the levels allowed during synchronization.)

The Jordon Canonical form of the second order model Equation (18) above is $$\dot{y}(t) = \begin{bmatrix} b & 0 \\ 0 & 0 \end{bmatrix} y(t) + \begin{bmatrix} k \\ -k/b \end{bmatrix} u(t) \quad (19)(20)$$

where $$y_1(t) = x'_2(t), \text{ and } y_2(t) = x'_3(t) - \frac{1+bk_2}{b} x'_2(t). \quad (21)$$

The Hamiltonian form for the minimum time problem is $$H = 1 + p_1(t)(by_1(t) + ku(t)) + p_2(t)\left(\frac{k}{b} u(t)\right).$$

The costate variables satisfy the equations $$\dot{p}_1(t) = -(H/y_1)(t) = -bp_1(t) \quad (22)$$

and $$\dot{p}_2(t) = -(H/y_2)(t) = 0. \quad (23)$$

Solving the above two equations for $p_1(t)$ and $p_2(t)$ yields $$p_1^*(t) = p_1(0)e^{-bt}$$

$$p_2^*(t) = p_2(0).$$

From Pontryagin's minimum principle, the optimal control law is $$U(t) = -\text{sgn}\left(kp_1(t) - \frac{k}{b} p_2(t)\right). \quad (24)$$

Thus
$u_1(t) = u_{1max}$
when
$U(t) = 1$
and
$u_1(t) = u_{1min}$
when
$U(t) = -1.$ Substituting Equations (22) and (23) into Equation (24) yields $$U_1(t) = -\text{sgn}\left(\frac{k}{b} p_2(0)e^{-bt} - \frac{k}{p} (0)\right).$$

Note that $U(t)$ changes sign at most once. Thus, at most, one switching is required to go from any initial point to the point $x_d$.

The switching locus for the minimum time control lies along the trajectories for the fuel commands $u_{1min}$ and $u_{1max}$ that pass through the point $(u_2(t)+0.002, 0)$. These trajectories are the solution to Equation (19) for $u$ equal to $u_{min}$ and $u_{max}$ where $$u_{min} = u_{1min} + (b/k)u_2(t)$$

and $$u_{max} = u_{1max} + (b/k)u_2(t).$$

The trajectory for the fuel command $u_c$ is $$y_1(t) = (y_1(0)+K)e^{bt} - K \quad (25)$$

and $$y_2(t) = -Kt + y_2(0) \quad (26)$$

where $$K = (k/b)u_c \tag{27}$$

and $y_1(0)$ and $y_2(0)$ are the values for the point on the trajectory corresponding to the time t equal to 0. Substituting Equations (15), (16), (20), (21) and (27) into Equations (25) and (26) and simplifying yields $$x_2(t) = \left(x_2(0) + \frac{k}{b} u_{1c}\right) e^{bt} - \frac{k}{b} u_{1c} \tag{28}$$

and $$x_3(t) = x_3(0) - \left(\frac{k}{b} u_{1c} + u_2(t)\right) t + \left(\frac{1 + bk_2}{b}\right)\left(x_2(0) + \frac{k}{b} u_{1c}\right)(e^{bt} - 1) \tag{29}$$

where $$u_{1c} = u_c - (b/k)u_2(t)$$

and $x_2(0)$ and $x_3(0)$ are the values for the point on the trajectory corresponding to the time t equal to 0.

Figure 12:
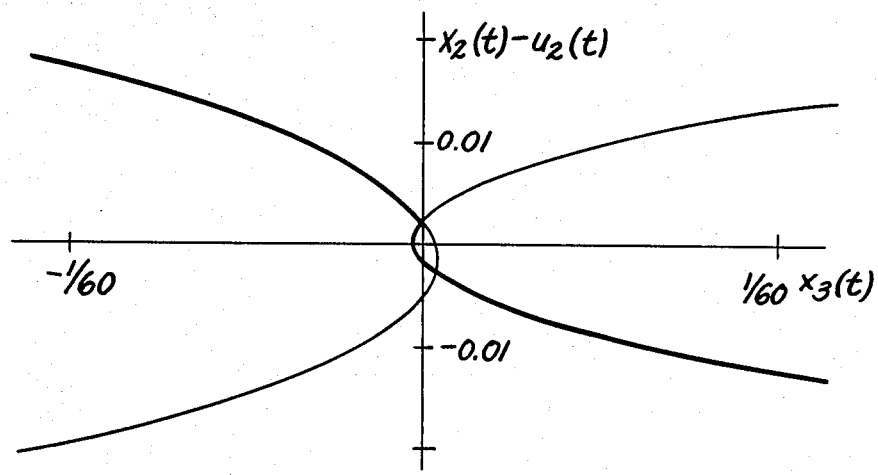
FIG. 12 is a plot in the phase-frequency difference plane of approximately parabolic maximum acceleration and maximum deceleration turbine-generator trajectories.

FIG. 12 is a plot of the approximately parabolic trajectories 250 and 252 which pass through the point $(u_2(t)+0.002, 0)$, designated 80. In FIG. 12, these trajectories 250 and 252 are plotted for
$u_2(t) = 1$,
$b = -0.033$,
$k = 0.1$,
$k_2 = -0.167589$,
$x_2(0) = 1.002$,
and
$x_3(0) = 0$.

The trajectory 250 is a minimum fuel command (deceleration) trajectory, and corresponds to
$u_{1c} = u_{1min} = 0.23$.

The trajectory 252 is a maximum fuel command (acceleration) trajectory, and corresponds to
$u_{1c} = u_{1max} = 0.38$.

Also shown as a heavier line in FIG. 12 is the fuel valve switching locus 254 for the minimum time control.

Rather than the relatively complex Equations (28) and (29) plotted as trajectories 250 and 252, parabolic approximations may be employed with a very close fit. The following parabolic equation is suitable, and can be employed to define the switching locus:

$$x_3(t) = \tfrac{1}{2}a(x_2(t) - u_2(t) + ak_2)^2 + C \tag{34}$$

where $$a = ku_c = k\left(u_{1c} + \frac{b}{k} u_2(t)\right), \text{ and} \tag{35}$$

$$C = x_3(0) - \tfrac{1}{2}a(x_2(0) - u_2(t) + ak_2)^2. \tag{36}$$

This parabolic approximation specifies a simple relationship between $x_2(t)$ and $x_3(t)$ which does not depend on t, and therefore greatly simplifies the calculations required for the fuel control to determine whether to output the fuel command $u_{1min}$ or $u_{1max}$. It is also a very good approximation for the values of $x_2(t)$, $x_3(t)$, $u_1(t)$ which will occur while the synchronization controller is activated. Substituting Equations (30) through (33) into Equations (34), (35) and (36) yields $$x_3(t) = \tfrac{1}{2}a(x_2(t) - u_2(t) - 0.167589a)^2 + C, \tag{37}$$

$$a = 0.1(u_{1c} - 0.33), \text{ and}$$

$$C = x_3(0) - \tfrac{1}{2}a(x_2(0) - u_2(t) - 0.167589a)^2. \tag{38}$$

Selecting the Optimal Synchronization Point

The minimum-time solution developed above drives the turbine-generator to a synchronization point. However, the synchronization controller must not only drive the gas turbine-generator to a synchronization point, but must also determine which synchronization point is the optimal one, i.e., the best value of M.

The overall objective of the subject synchronization fuel control is to drive the gas turbine-generator trajectory to the point $(x_2(t), x_3(t)) = (u_2(t)+0.002, M/60)$ in minimum time while satisfying certain constraints. The best value of M must be picked by the control algorithm used. The criteria for choosing the best value of M are (1) Minimize the time required to drive the trajectory to the synchronizing point, and (2) Minimize the temperature cycling and stress on the hot-gas path parts of the gas turbine.

Described next is the development of an algorithm, expressed as functions in phase-frequency difference space, which determines the best value of M and then drives the turbine-generator to the corresponding synchronizing point.

In particular, the optimal value of M is determined for all regions in the generator-power system phase and frequency difference plane. The turbine fuel controller determines what region of the phase frequency difference plane an initial point lies in. This is a relatively simple calculation. Once the region that an initial point lies in has been determined, the optimal value of M is known. The minimum time control switching locus that corresponds to this optimal value of M is then used to determine the fuel command $u_1(t)$ and the gas turbine-generator is driven to the optimal synchronization point.

If the minimum time control's switching loci for a few adjacent synchronizing points $(u_2(t)+0.002, M/60)$ are drawn, and the time required to traverse the path from an initial point to each of these synchronizing points calculated, it can be determined which synchronizing point is the optimal one. FIG. 4, introduced hereinabove, shows the minimum time control switching loci for the points $(u_2(t)+0.002, M/60)$ where M equals $-1$, 0, and 1.

In the development of the FIG. 4 switching loci, $(x_2(0), x_3(0))$ is the particular synchronizing point to which a particular locus corresponds. Thus, $$x_2(0) = u_2(t) + 0.002 \text{ and} \tag{38a}$$

$$x_3(0) = M/60. \tag{38b}$$

Substituting Equations (38a) and (38b) into Equation (38) yields $$C = M/60 - \tfrac{1}{2}a(0.002 - 0.167589a)^2. \tag{39}$$

Substituting Equations (39) into Equation (37) yields $$x_3(t) = \tfrac{1}{2}a(x_2(t) - u_x(t) - 0.167589a)^2 + M/60 - \tfrac{1}{2}a(0.002 - 0.167589a)^2. \qquad (40)$$

Substituting the minimum fuel command
$u_{1min} = 0.23$
into Equation (40) yields $$x_3(t) = -50(x_2(t) - u_2(t) + 0.00167589)^2 + M/60 + 6.7222 \times 10^{-4}. \qquad (41)$$

Substituting the maximum fuel command
$u_{1max} = 0.38$
into Equation (40) yields $$x_3(t) = 100(x_2(t) - u_2(t) - 0.000837945)^2 + M/60 - 1.3611 \times 10^{-4}. \qquad (42)$$

From these loci and trajectories plotted in FIG. 4 one can determine, in a manner described hereinafter with reference to FIG. 14, the time required to get from any initial point $(x_2(t), x_3(t))$ to any of the synchronizing points $(u_2(t) + 0.002, -1/60)$, $(u_2(t) + 0.002, 0)$, and $(u_2(t) + 0.002, 1/60)$ for $$-1/60 \leq x_3(t) \leq 1/60$$

Thus the synchronizing point that can be reached in minimum time using the minimum time controller can be determined for any initial point $(x_2(t), x_3(t))$ in FIG. 4.

Figure 13:
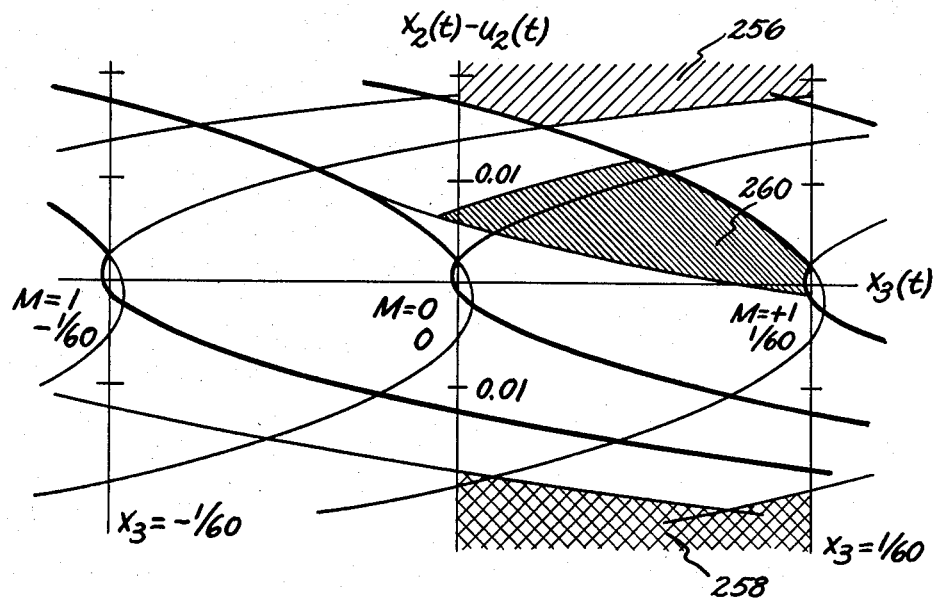
FIG. 13 depicts specific fuel commands for various areas or regions in the phase-frequency difference plane.

Considering specific fuel commands in the controller function determination thus far, in FIG. 13 the lined area 256 is a region where the desired minimum fuel command should be output no matter which synchronizing point is the one that can be reached in minimum time. The cross hatched area 258 is a region where the desired maximum fuel command should be output. The remaining area between the lined and cross hatched regions 256 and 258 is the area where it is not obvious as to which point (value of M) is the optimal one for synchronizing.

Up to this point we have been concerned only with picking the point that will allow synchronization in the shortest amount of time. A second criterion which must be met is that the stress on the gas turbine is minimized while its trajectory is being driven to the optimal point for synchronizing. The maximum and minimum fuel command constraints are designed to maintain acceptable stress levels in the gas turbine hot-gas-path parts. However, rapidly changing the fuel command to the gas turbine can cause temperature cycling of the hot-gas-path components and cause fatigue.

The temperature cycling of the gas path parts can be minimized if the correct point is picked for synchronization. For a normal start up of the gas turbine-generator, the FIG. 1 startup controller 46 will have been calling for the maximum fuel command for a minute or two when it relinquishes control of the turbine-generator to the synchronization controller 48. The turbine-generator frequency at this point is about 5% lower than the power system frequency when the synchronization controller 48 is activated. The phase $x_3(t)$ and frequency $x_2(t)$ of the machine are thus in the cross hatched region 258 of the FIG. 14 phase-frequency difference plane. Thus the synchronization controller 48 initially also calls for the desired maximum fuel command.

As the trajectory enters the region between the lined and cross hatched areas 256 and 258 of FIG. 13, the decision must be made as to which point is optimal for synchronization, and the turbine trajectory driven to that point.

Using the minimum time control algorithm for the approximated gas turbine generator model, the solution involves calling for maximum fuel while in the cross hatched region 258 of FIG. 13, then calling for minimum fuel, and then calling for maximum fuel again either just before or just after generator 32 connection to the power system bus 38. Once connected to the power system bus 38, the turbine fuel command is further increased as the load on the power plant is increased.

The maximum amount of fuel that the synchronization controller 48 is allowed to call for is the amount of fuel input to the gas turbine 22 just before the synchronization process begins. The fuel flow after synchronization is completed is increased above the levels allowed during synchronization. The temperature cycles and thus the stress on the gas turbine hot-gas-path parts would be minimized if the maximum fuel command was maintained throughout synchronization. This is not always possible, but the amount that the fuel command is below its maximum limit during synchronization can be minimized by picking the right synchronization point.

It has been determined that if the fuel command changes from its maximum value to its minimum value and back to its maximum value, no temperature cycling of the gas turbine hot-gas-path parts occurs if the amount of time that the minimum fuel command is output is not more than one second. This is due to the fact that the thermal time constants for the hot-gas-path parts are much longer than one second when the turbine speed is nearly 100%.

For the shaded area 260 of FIG. 13, it can be shown, if the turbine-generator were to be driven to the point $(u_2(t) + 0.002, 0)$, the minimum fuel command would be output for more than one second. However, if the turbine-generator is driven to the point $(u_2(t) + 0.002, 1/60)$ the minimum fuel command would be output for less than one second. Therefore, when the initial point is in the region 260 the proper synchronizing point is $(u_2(t) + 0.002, 1/60)$, regardless of minimum-time considerations.

This shaded region 260 is the only area where the optimal point for synchronizing is determined not by the time required to reach it but by the requirement to minimize the amount of time that the minimum fuel command is output. For all other regions between $x_3(t) = 0$ and $x_3 = 1/60$ that are below this shaded area 260, the time which the minimum fuel command is output is less than one second for the synchronization point which can be reached in minimum time. For the regions above the shaded area 260, the minimum fuel command is output for more than one second for any point picked for synchronization. However, for a normal synchronization where the synchronization controller 48 takes over with the turbine-generator below synchronous speed, regions above the shaded area 260 are not entered.

To summarize based on the analysis up to this point, we can determine that the fuel control output should be as follows:

(1) If the gas turbine-generator and power system frequency difference $x_2(t) - u_2(t)$ and the phase difference of the generator and power system $x_3(t)$ are in the lined area 256 of FIG. 13, output the minimum fuel command.

(2) If $x_2(t) - u_2(t)$ and $x_3(t)$ are in the cross hatched area 258 of FIG. 13 output the maximum fuel command.

(3) If $x_2(t) - u_2(t)$ and $x_3(t)$ are in the shaded area 260 of FIG. 13 drive the trajectory to the point $x_3(t) = 1/60$ and $x_2(t) = u_2(t) + 0.002$ using the minimum time controller described above.

Figure 14:
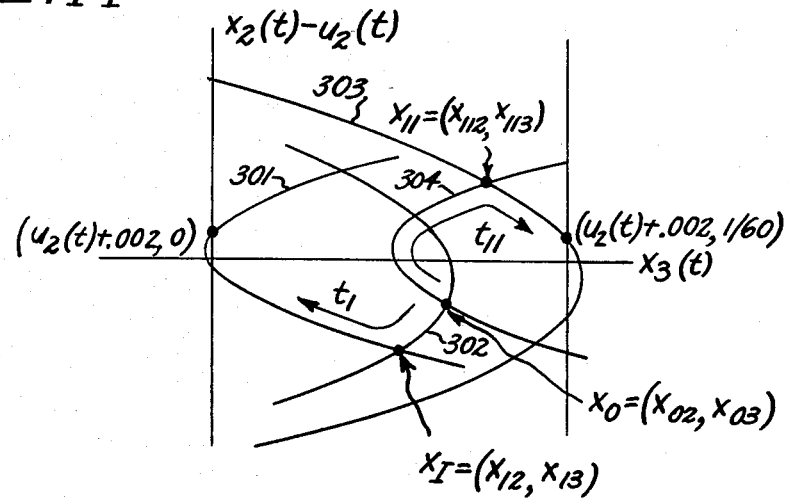
FIG. 14 is a plot in the phase-frequency difference plane illustrating the manner in which two candidates for the minimum-time synchronization point are compared.

In order to complete the fuel control algorithm, in other words, to complete the determination of the fuel control functions, it must be determined which optimal synchronization point can be reached in minimum time from any initial point $x(0) = (x_2(0), x_3(0))$ in the unshaded and unlined regions of FIG. 14 for which $0 \leq x_3(0) \leq 1/60$. In other words, the functions must be defined for all regions with a phase angle difference of 0° to 360°, inclusive, and outside any of the three regions 256, 258 and 260.

From FIG. 13, it can be seen that there are two optimal synchronization points, corresponding to $M = 0$ and $M = 1$, which are candidates to be the optimal synchronization point for a given initial point. A method that determines which of these two candidates can be reached in minimum time is developed next, with reference to FIG. 14.

FIG. 14 shows an initial point $x_0 = (x_{02}, x_{03})$ and the trajectories that will bring the turbine-generator to the points $(u_2(t) + 0.002, 0)$ and $(u_2(t) + 0.002, 1/60)$ in minimum time. To drive the turbine-generator from $x_0$ to $(u_2(t) + 0.002, 0)$ in minimum time, the path $t_I$ along curves 302 and 301 is taken, with the fuel command switching from minimum to maximum at point $x_I = (x_{I2}, x_{I3})$. To drive the turbine-generator from $x_0$ to $(u_2(t) + 0.002, 1/60)$ in minimum time, the path $t_{II}$ along curves 304 and 303 is taken, with the fuel command switching from maximum to minimum at point $x_{III} = (x_{II2}, x_{II2})$.

Through algebraic manipulation, described in detail in the above-incorporated Master's thesis by Timothy P. Near entitled "A Gas Turbine-Generator Synchronizer", expressions can be derived describing the respective times required to follow the paths $t_I$ and $t_{II}$. Based on these expressions, for any initial point $x_0$, the point $(u_2(t) + 0.002, 0)$ is the optimal synchronizing point if $t_I$ is less than $t_{II}$. The points for which $t_I$ is equal to $t_{II}$ form the boundaries between the areas in the phase and frequency difference plane for which $(u_2(t) + 0.002, 1/60)$ is the optimal synchronizing point. These boundaries are referred to hereinafter as "synchronization point decision lines".

Also described in the above-incorporated thesis is a calculation procedure (for convenience employing a digital computer) for calculating the points $x_0 = (x_{02}, x_{03})$ for which $t_I$ is equal to $t_{II}$.

Figure 15:
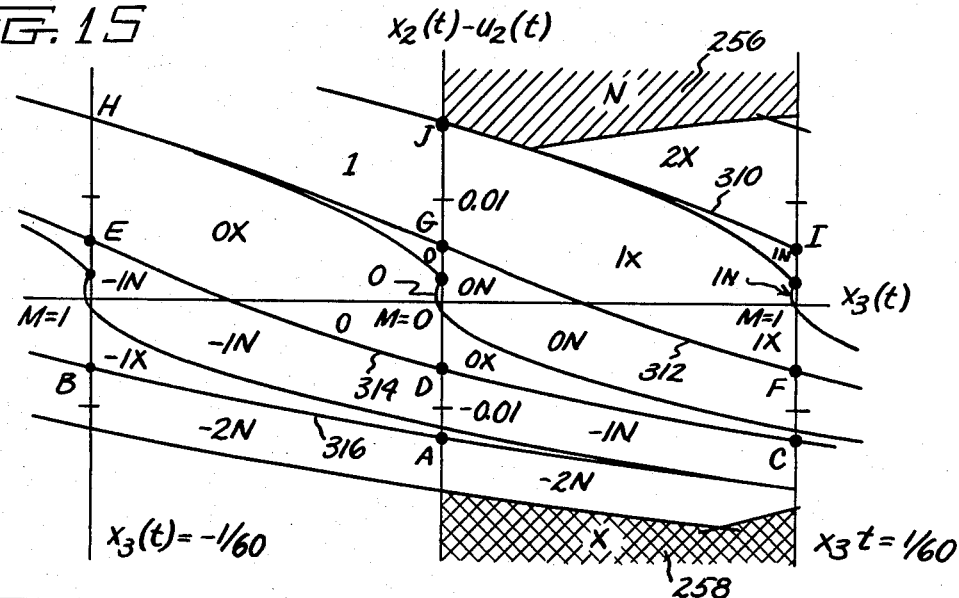
FIG. 15 is a plot in the phase-frequency difference plane depicting calculated synchronization point decision lines.
Figure 16:
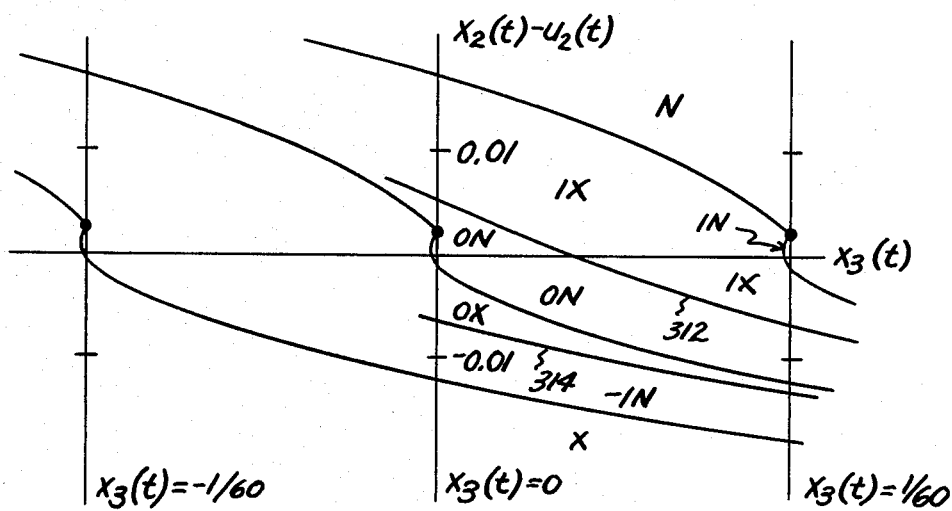
FIG. 16 is a modified version of FIG. 15.

These calculated synchronization point decision lines or boundaries are shown in FIG. 15 as lines 310, 312, 314 abnd 316. The various areas or regions in FIG. 16 are also labeled with integers $-2$, $-1$, 0 and 1 to indicate the optimal value of M for any initial point which lies in that region, and also are labeled "N" or "X" to indicate whether the minimum or maximum fuel command should be given. Exceptions are the regions 256 and 258 for which minimum and maximum fuel commands are respectively indicated, but for which no value of M is indicated. Thus, when the gas turbine-generator and power system frequency difference and phase difference are in a region labeled with an N, the minimum fuel command ($u_1(t) = 0.23$) is output. When the frequency difference and phase difference are in a region labeled with an X, the maximum fuel command ($u_1(t) = 0.38$) is output.

In FIG. 15, it may be noted that the segment of the synchronization point decision line 316 between points A and B corresponds to the segment of decision line 314 between point C and D. The segment of line 314 between points D and E is equivalent to the segment of line 312 between points F and G. The segment of line 312 between points G and H corresponds to the segment of line 310 between points I and J.

By comparing FIGS. 13 and 15, it may be noted that the FIG. 13 shaded region 260 (for which it was determined as described above that the optimal value of M is 1 in order to minimize the temperature cycling and stress of the gas turbine hot-gas-path parts) is completely enclosed by regions in FIG. 15 for which the optimal value of M is 1. Thus the synchronizing point picked in order to minimize the wear on the gas turbine is also the synchronizing point that can be reached in minimum time.

The regions and functions presented in FIG. 15, while theoretically optimal, have a number of drawbacks in the context of a practical system, particularly in a computer-based system which samples the phase and frequency differences at discrete intervals. Another reality of a practical system is fuel valve delay, as a result of which a trajectory cannot switch instantly from one curve to another.

As a result of these considerations, if the FIG. 15 regions and functions were to be employed as-is, system instabilities can result, and even failure to reach a synchronization point at all.

As one example, the FIG. 15 region labeled $-1X$ is particularly narrow. It is possible, even likely, that this region will be passed through between sample periods. This can cause the turbine-generator trajectory to always stay in the regions $-1N$ and $-2N$ and a synchronizing point will never be reached.

There is also a narrow region labeled 1N between the regions labeled 1X and regions labeled 2X. It is likely that this region will be passed through between sample periods. This can cause the turbine-generator trajectory to always stay in the regions labeled 1X and 2X and a synchronizing point will never be reached.

To avoid these narrow regions, the FIG. 15 regions may be slightly altered to the assignment of synchronizing points and fuel commands shown in FIG. 16. In FIG. 16, the lines 310 and 316 are eliminated. As a result of this change, the turbine-generator might not be driven to the best synchronization point in terms of a minimum time solution, but this is a minor compromise in view of the alternative of possibly never reaching a synchronizing point.

Consistent with FIG. 16, the sampling period must be picked so that no region can be passed through between sampling periods. The narrowest region is that labeled 0X. A sampling period of 0.05 seconds will ensure that this region 0X cannot be passed through in one sample period or less.

As explained hereinabove, during actual operation the synchronization controller 48 must either continuously or at discrete intervals determine from frequency and phase difference information, and based on predetermined functions, in what region of FIG. 16 each particular sample point lies. These calculations are greatly simplified if the curve between the region labeled 1X and the regions labeled 0N is approximated by a straight line. The calculations are also simplified if the curve between the regions labeled 0X and −1N is approximated by a straight line.

Through calculations detailed in the above incorporated Master's thesis, the line 312 between the two regions labeled 1X and the two regions labeled 0N can be approximated by a least squares linear fit. The same may be done for the line 314 between the regions labeled 0X and −1N.

As a result, the line 312 may be represented by the linear equation $$(x_2(t)-u_2(t))=-0.7313x_3(t)+0.004875. \quad (43)$$

The line 314 may be represented by the linear equation $$(x_2(t)-u_2(t))=-0.4467x_3(t)-0.006664.$$

The line 314 in its modified straight form, compared to its unmodified current form, is nearly identical for $0 \leq x_3(t) \leq 1/120$, but slightly widens the region labeled 0X for $1/120 \leq x_3(t) \leq 1/60$. Since this widens the narrowest part of the narrowest region in FIG. 16, it allows a longer sampling period with an insignificant amount of degradation in the performance of the synchronization fuel control.

For the synchronization point and fuel command assignments shown in FIG. 16, with straight line approximations of the lines 312 and 314, the sampling period must be 0.1 seconds or less to ensure that the optimal synchronizing point will always be reached. Whenever $x_2(t)$ and $x_3(t)$ are in a region labeled with an L, the minimum fuel command $$u_1(t)=u_{1min}=0.23$$

is output. Whenever $x_2(t)$ and $x_3(t)$ are in a region labeled with an R, the maximum fuel command $$u_1(t)=u_{1max}=0.38$$

is output.

Refinement by Simulation

The exemplary calculations described above result in the controller functions depicted in FIG. 16. However comparison of FIG. 5 depicting the final functions with FIG. 16 will reveal that more has been done to refine the optimal control functions.

In particular, as a final test of the particular functions developed, the synchronization fuel control 48 was simulated on a digital computer. The gas turbine-generator was simulated using the third order model described hereinabove with reference to FIG. 9 and the fourth order Runge-Kutta method of numerical integration. The state equations and constants employed are those described above with reference to FIG. 9.

Figure 17:
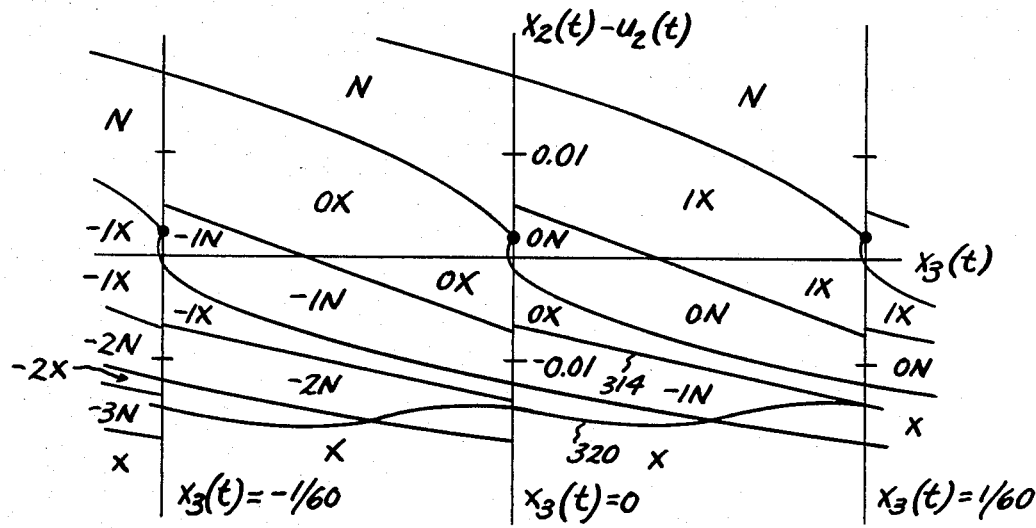
FIG. 17 is a plot in the phase-frequency difference plane depicting a simulated control malfunction.

FIG. 17 depicts a problem which caused the simulated control to malfunction, and never reach a synchronization point. In FIG. 17, the turbine-generator trajectory is designated 320, and runs from right to left.

In the case simulated, the turbine-generator speed oscillates around 0.985 forever, the trajectory never leaving the two regions at the bottom. The reason is, every time the phase difference $x_3(t)$ passes through 0 or an integer multiple of 1/60 per unit, the control changes the synchronization point to which it is trying to drive the trajectory, and switches the fuel command from maximum to minimum.

This particular problem is corrected if the synchronization point decision line 314 between the regions 0X and −1N (with reference to phase differences $x_3(t)$ between 0 and 1/60) is lowered by 0.001. This modifies the equation for this line, previously expressed in Equation (43) above, to $$(x_2(t)-u_2(t))=-0.4467x_3(t)-0.007664$$

This modification causes the synchronization 48 to occasionally drive the turbine-generator to a synchronizing point other than the one that can be reached in minimum time. When this occurs it takes a few tenths of a second longer to reach a synchronizing point than it would if the optimal point had been driven to. This degradation in performance is relatively small and acceptable.

Although shifting the synchronization point decision line 314 fixes the oscillation problem, this fix is sensitive to variations of the gas turbine-generator model parameters. The sensitivity of the synchronization controller fuel control to model parameter variations would be less if this synchronization point decision line 314 is eliminated. Whether this would actually be a good idea in a particular case would require further evaluation, and the synchronization point decision line 314 is retained in the subject synchronization controller 48. Although the elimination of this synchronization point decision line 314 would make the synchronization controller less sensitive to variations of the turbine-generator model parameters and simplifies the calculations required during operation to determine the fuel control output $u_1(t)$, it can increase the time required to reach a synchronization point and the amount of time that the minimum fuel command is output. This will in turn cause the gas turbine hot-gas-path parts to experience larger temperature cycles.

Simulation enabled another problem to be recognized. In particular, due to the fuel valve delay, the control was observed to occasionally drive the gas turbine-generator on a trajectory that oscillated once or twice about a synchronization point decision line. The control could change which point it was driving the turbine generator toward two or three times before settling on one point and driving to it. Although this does not prevent the turbine-generator from reaching a synchronization point, it does increase the time required to reach the point and occasionally causes the controller to not pick the synchronization point that can be reached in minimum time.

The FIG. 5 controller deadbands 128 and 130 around the synchronization point decision lines 133 and 135 (312 and 314 in FIG. 17) solve this problem. The following reasoning was used to determine that a deadband around each of these decision lines would solve the observed oscillation. Note that the parabolas on which the switching loci lie are not centered about the $x_3(t)$ axis but are shifted slightly up or down. If there were no delay in the fuel valve, the parablolas would be centered about the $x_3(t)$ axis. Anywhere that the gas turbine-generator trajectory crosses the switching locus in the upward direction, the locus is shifted down by 0.00167589. Anywhere that the gas turbine-generator trajectory crosses the switching locus in the downward direction, the locus is shifted up by the amount 0.000837945. This shifting of the loci compensates for the fuel valve delay. The same type of compensation is needed for the synchronizing point decision lines. Since the decision lines can be crossed in either direction, they both need to be shifted up by 0.000837945 and shifted down by 0.00167589, and this is accomplished by the controller deadbands 128 and 130. The controller deadbands extends from 0.000837945 above each synchronization point decision line to 0.00167589 below the decision line. While $x_2(t)$ and $x_3(t)$ lie in one of these deadband regions, the fuel command is not changed.

With this final refinement, the regions of FIG. 5 result, as expressed as functions or Equations (1) through (6) or (7) through (12), above.

To more rigorously explain the shifting of the parabolas up, and the related need for the controller deadbands 128 and 130, it can be shown that if the fuel valve delay is zero ($k_f=0$) and if the derivative $$\dot{x}_2(t)=0.1(u_1(t)-0.33x_2(t))$$

is approximated by $$\dot{x}_2(t)=0.1(u_1(t)-0.33)=a, \quad (44) \text{ PS}$$

the minimum time control's switching loci lie on the parabolic trajectories $$x_3(t)=\tfrac{1}{2}a(x_2(t)-u_2(t))^2+x_3(0)-\tfrac{1}{2}a(x_2(0)-u_2(t))^2. \quad (45)$$

The approximation of Equation (44) is valid because $x_2(t)$ varies at most 2% from the value of 1.0 when the minimum time controller switching loci are used to determine the fuel control output $u_1(t)$.

Note the similarity between Equation (45) and Equation (34). The parabola specified by Equation (45) is centered around the $x_3(t)$ axis in the phase and frequency difference plane. The parabola specified by Equation (34) is the same as that specified by Equation (45) except that it is shifted off of the $x_3(t)$ axis by the amount $-ak_2$.
Note that
$k_2 = -0.167589$.
The reciprocal of the fuel system constant is
$k_f = 6$.
Thus the fuel system time constant is
$T_f = 1/k_f = 0.166667$.
Note that
$k_2 \approx T_f$.
Thus, we can say the two parabolas on which the switching loci for the minimum time control lie are shifted off the $x_3(t)$ axis by the amount $-aT_f$. Note that $a$ is the value of the gas turbine-generator acceleration for each of the two trajectories on which the switching loci lie. The two values of $a$ are the acceleration of the turbine-generator corresponding to the maximum and minimum fuel commands $u_{1max}$ and $u_{1min}$.

In summary, the minimum time control's switching locus lies on parabolic trajectories that are shifted from being centered about the $x_3(t)$ axis by an amount proportional to the fuel valve time constant and the minimum and maximum fuel flow accelerations of the gas turbine-generator.

Controller Performance

Figure 18A:
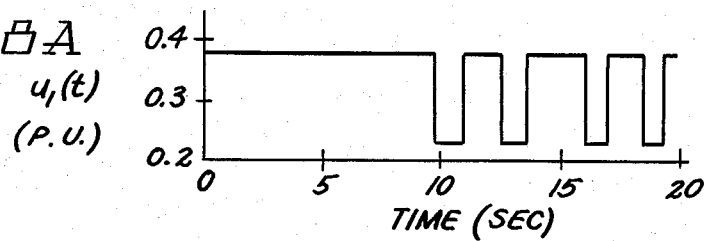
FIGS. 18A, 18B and 18C are controller performance curves for a normal synchronization.
Figure 18B:
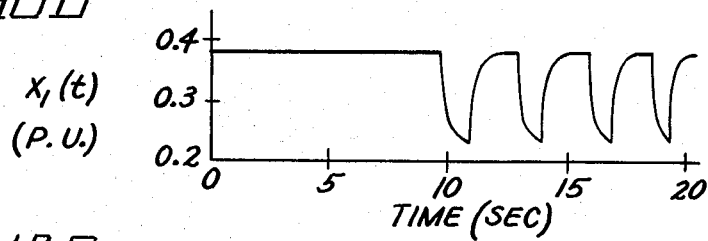
Figure 18C:
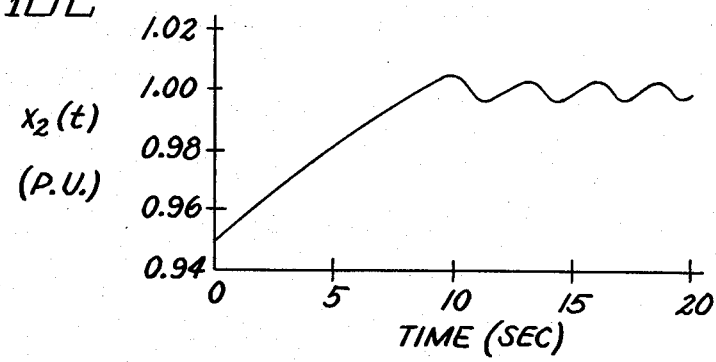
Figure 19A:
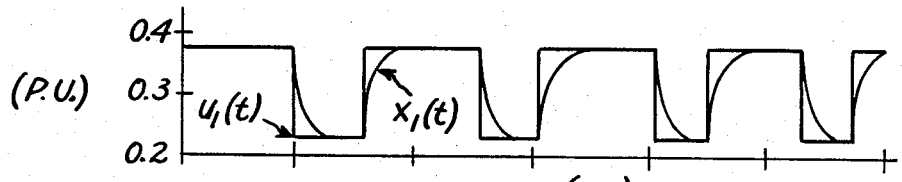
FIGS. 19A and 19B are similar performance curves on an expanded time scale.
Figure 19B:
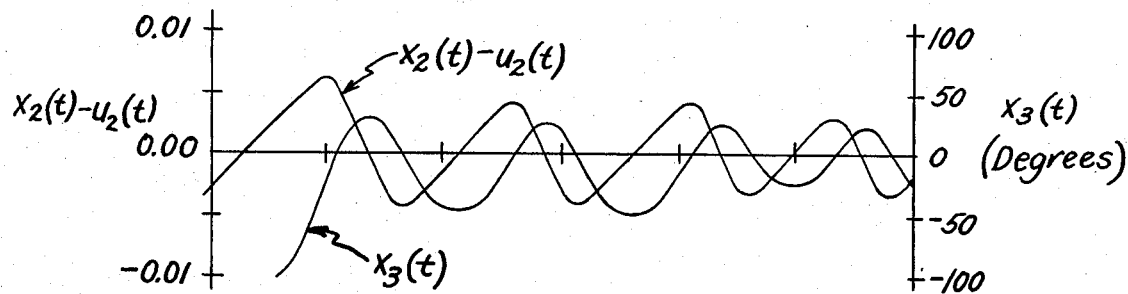

Controller performance for a normal synchronization is presented in FIGS. 18A, 18B, 18C, 19A and 19B. A "normal" synchronization is one where the synchronization process begins with turbine-generator speed below synchronous speed. FIGS. 18A, 18B and 18C are on a time scale of 0 to 20 seconds, and respectively plot fuel command $u_1(t)$, fuel flow $x_1(A)$ and generator frequency $x_2(A)$. FIGS. 19A and 19B are on an expanded time scale of 8 to 20 seconds. FIG. 19A plots both fuel command $u_1(A)$ and fuel flow $x_1(A)$. FIG. 19B plots both phase difference $x_3(A)$ and frequency difference $x_2(t) - U_2(A)$.

The oscillation seen in FIGS. 18A–19B occurs because the synchronizing points are not equilibrium points and because, for purpose of evaluation, a breaker-close command is not given. The synchronization controller 48 drives the gas turbine-generator to the optimal synchronization point. As the turbine-generator cannot stay at this point, it passes right on through it (or close to it). The synchronization controller 48 then drives back to this point. The oscillation seen is the action of the synchronization controller 48 controller continually driving the turbine-generator back to the optimal synchronization point.

Normally this oscillation will not occur. The first time the turbine-generator passes through the optimal synchronization point, the FIG. 1 circuit breaker 36 is closed. This then causes the turbine-generator frequency $x_2(t)$ to settle to the system frequency $u_2(t)$. The phase difference $x_3(t)$ settles to zero degrees. In FIGS. 18A–19B, the circuit breaker 36 normally would close between the times 10.2 sec. and 10.3 sec. Only if the circuit breaker closing mechanism failed to function would the turbine-generator oscillate, as it is continually driven back to the optimal synchronization point.

The optimal point for synchronization is $(u_2(t)+0.002, M/60)$. However, any value of $x_2(t)$ between $u_2(t)-0.001$ and $u_2(t)+0.005$, and where $x_3(t)$ is equal to zero, is an acceptable point for synchronization. The value of $x_2(t)$ was always between $u_2(t)+0.002$ and $u_2(t)+0.005$ when $x_3(t)$ was equal to 0 in the simulation. Therefore, the fuel control algorithm is an acceptable one.

It was observed, however, that the turbine-generator was always driven on a trajectory that passed through the acceptable synchronizing region above the synchronization point. This is due to the fuel valve delay and the fact that a new control output is calculated only periodically (every sample period). Increasing the sampling rate caused the turbine-generator to be driven closer to the optimal synchronization point. However, even if an infinite sampling rate is used (i.e. a continuous time controller), the trajectory on which the gas turbine-generator is driven will pass slightly above the optimal synchronization point. This is due to the fact that a second order minimum time controller is being used to drive a third order gas turbine-generator.

The simulation was run with a 10 Hz sampling period. Regardless of the initial conditions used, after the turbine-generator has passed through the region acceptable for synchronization three or four times, the value of the frequency difference when the phase difference is equal to zero converged to 0.0032. The optimal frequency difference is 0.002 when the phase difference equals zero. The turbine-generator may be driven on a trajectory that passes closer to the synchronization point if, instead of having the minimum time control drive to the synchronization point $(u_2(t)+0.002, M/60)$ it drove the turbine-generator to the point $(u_2(t)+0.001, M/60)$.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An automatic synchronization fuel control for guiding an AC generator having an output into synchronization with an AC power system, said output of said generator and said power system each having respective AC voltages associated therewith, said generator being of a type which is driven by a turbine, said synchronization fuel control comprising:

first means for determining an instantaneous frequency difference and an instantaneous phase difference between said power system voltage and said generator output voltage;

second means for providing one of a first signal command for supplying a fixed predetermined minimum fuel flow to said turbine and a second signal command for supplying a fixed predetermined maximum fuel flow to said turbine;

said fixed predetermined maximum fuel flow being of a first value which is effective to produce a substantially constant acceleration of said generator, and said fixed predetermined minimum fuel flow being of a second value which is effective to produce a substantially constant deceleration of said generator;

third means for substantially continuously comparing said instantaneous frequency difference and said instantaneous phase difference; and fourth means for determining, in accordance with predetermined functions, whether said second means should provide said first signal or said second signal, said predetermined functions being selected so as to guide said generator to an optimal synchronization point at which a predetermined frequency difference and a predetermined phase difference exist.

2. An automatic synchronization fuel control in accordance with claim 1, wherein said predetermined functions include trajectories for guiding said generator to a synchronization point in a minimum time consistent with minimizing temperature stress on said turbine.

3. An automatic synchronization fuel control in accordance with claim 2, wherein said predetermined functions are selected such that said first signal is never output for longer than a predetermined maximum time duration effective to minimize temperature stress on said turbine.

4. An automatic synchronization fuel control in accordance with claim 3, wherein said predetermined maximum time duration for said first signal is in the order of one second.

5. An automatic synchronization fuel control for guiding an AC generator having an output into synchronization with an AC power system, said generator output and said power system each having respective AC voltages associated therewith, said generator being of a type which is driven by a turbine, said synchronization fuel control comprising:

first means for determining an instantaneous frequency difference and an instantaneous phase difference between said power system voltage and said generator output voltage;

second means for providing either a first signal command for supplying a fixed predetermined minimum fuel flow to said turbine or a second signal command for supplying a fixed predetermined maximum fuel flow to said turbine, wherein said fixed predetermined minimum fuel flow is approximately equal to a minimum level of fuel flow required to sustain operation in said turbine, and said fixed predetermined maximum fuel flow is a maximum level of fuel flow normally called for by a startup controller during turbine acceleration near but below synchronous speed;

third means for substantially continuously comparing said instantaneous frequency difference and said instantaneous phase difference; and fourth means for determining, in accordance with predetermined functions, which of said first signal and said second signal should be provided by said second means, said predetermined functions being selected so as to guide said generator to an optimal synchronization point at which a predetermined frequency difference and a predetermined phase difference exist between said generator and said power system.

6. An automatic synchronization fuel control in accordance with claim 5, wherein said third means includes means for determining that, during a normal generator startup, said second means initially provide said first signal and, said second means provides said second signal no more than once.

7. An automatic synchronization fuel control for guiding an AC generator having an output into synchronization with an AC power system, said output of said generator and said power system each having respective AC voltages associated therewith, said generator being of a type which is driven by a turbine, said synchronization fuel control comprising:

first means for determining an instantaneous frequency difference and an instantaneous phase difference between said power system voltage and said generator output voltage;

second means for providing one of a first signal command for supplying a fixed predetermined minimum fuel flow to said turbine and a second signal command for supplying a fixed predetermined maximum fuel flow to said turbine;

said fixed predetermined maximum fuel flow being of a first value which is effective to produce a substantially constant acceleration of said generator, and said fixed predetermined minimum fuel flow being of a second value which is effective to produce a substantially constant deceleration of said generator;

third means for repeatedly comparing said instantaneous frequency difference and said instantaneous phase difference; and fourth means for determining, in accordance with predetermined functions, whether said second means should provide said first signal or said second signal, said predetermined functions being selected so as to guide an optimal synchronization point at which a predetermined frequency difference and a predetermined phase difference exist.

8. An automatic synchronization fuel control in accordance with claim 7, wherein said predetermined functions include trajectories for guiding said generator to a synchronization point in a minimum time consistent with minimizing temperature stress on said turbine.

9. An automatic synchronization fuel control in accordance with claim 8, wherein said predetermined functions are selected such that said first signal is never output for longer than a predetermined maximum time duration calculated effective to minimize temperature stress on said turbine.

10. An automatic synchronization fuel control in accordance with claim 9, wherein said predetermined maximum time duration for said first signal is in the order of one second.

11. An automatic synchronization fuel control in accordance with claim 7, wherein said third means is of a type which performs said repeated comparison of said instantaneous frequency difference and said instantaneous phase difference at intervals at least in the order of once every one-tenth second.

12. A method for guiding an AC generator having an output into synchronization with an AC power system, said generator output and said power system each having respective voltages associated therewith, said generator being of a type which is driven by a turbine, said method comprising:
 determining, on a substantially continuously basis, an instantaneous frequency difference and an instantaneous phase difference between said power system voltage and said generator output voltage;
 comparing, on a substantially continuously basis, said instantaneous frequency difference and said instantaneous phase difference, said comparison having a result and being performed in accordance with predetermined functions to determine which of a fixed predetermined minimum fuel flow to said turbine and a fixed predetermined maximum fuel flow to said turbine is to be commanded, said predetermined functions being selected so as to guide said generator to a synchronization point at which a predetermined frequency difference and a predetermined phase difference exist; and
 commanding one of said fixed predetermined minimum fuel flow and said fixed predetermined maximum fuel flow depending upon said result.

13. A method in accordance with claim 12, wherein said predetermined functions include trajectories for guiding said generator to an optimal synchronization point in minimum time consistent with minimizing temperature stress on said turbine.

14. A method in accordance with claim 13, wherein said predetermined functions are selected so that said desired minimum fuel flow command is never output for longer than a predetermined maximum time duration effective to minimize temperature stress on said gas turbine.

15. A method in accordance with claim 14, wherein said predetermined maximum time duration for said desired minimum fuel command is in the order of one second.

16. A method for guiding an AC generator having an output into synchronization with an AC power system, said generator output and said power system each having respective voltages associated therewith, said generator being of a type which is driven by a turbine, said method comprising:
 determining, on a repeated basis, an instantaneous frequency difference and an instantaneous phase difference between said power system voltage and said generator output voltage;
 comparing, on a repeated basis, said instantaneous frequency difference and said instantaneous phase difference, said comparison having a result and being performed in accordance with predetermined functions to determine which of a fixed predetermined minimum fuel flow to said turbine and a fixed predetermined maximum fuel flow to said turbine is to be commanded, said predetermined functions being selected so as to guide said generator to a synchronization point at which a predetermined frequency difference and a predetermined phase difference exist; and
 commanding one of said fixed predetermined minimum fuel flow and said fixed predetermined maximum fuel flow depending upon said result.

17. A method in accordance with claim 16, wherein said predetermined functions including trajectories for guiding said generator to an optimal synchronization point in minimum time consistent with minimizing temperature stress on the gas turbine.

18. A method in accordance with claim 17, wherein said predetermined functions are selected so that said desired minimum fuel flow command is never output for longer than a predetermined maximum time duration effective to minimize temperature stress on said turbine.

19. A method in accordance with claim 18, wherein said predetermined maximum time duration for said desired minimum fuel command is in the order of one second.

20. A method in accordance with claim 16, wherein said comparing of said instantaneous frequency difference and instantaneous phase difference is performed at intervals at least in the order of once every one-tenth second.

21. An automatic synchronization fuel control for guiding an AC generator having an output into synchronization with an AC power system, said generator output and said power system each having respective AC voltages associated therewith, said generator being of a type which is driven by a turbine, said synchronization fuel control comprising:
 first means for determining an instantaneous frequency difference and an instantaneous phase difference between said power system voltage and said generator output voltage;
 second means for providing either a first signal command for supplying a fixed predetermined minimum fuel flow to said turbine or a second signal command for supplying a fixed predetermined maximum fuel flow to said turbine;
 third means for substantially continuously comparing said instantaneous frequency difference and said instantaneous phase difference; and
 fourth means for determining, in accordance with predetermined functions, which of said first signal and said second signal should be provided by said second means, and including means for determining that, during a normal generator startup, said second means should initially provide said first signal, and should switch to provide said second signal no more than once;
 wherein said predetermined functions are selected so as to guide said generator to an optimal synchronization point at which a predetermined frequency difference and a predetermined phase difference exist between said generator and said power system.

22. An automatic synchronization fuel control in accordance with claim 21, wherein said predetermined functions are selected so that said first signal is never output for longer than a predetermined maximum time duration effective to minimize temperature stress on said turbine.

23. A method in accordance with claim 22, wherein said predetermined maximum time duration for said first signal is in the order of one second.

24. An automatic synchronization fuel control in accordance with claim 21, wherein said predetermined functions include trajectories for guiding said generator to a synchronization point in minimum time consistent with minimizing temperature stress on said turbine.

25. An automatic synchronization fuel control in accordance with claim 24, wherein said predetermined functions are selected such that said first signal is never output for longer than a predetermined maximum time duration effective to minimize temperature stress on said turbine.

26. An automatic synchronization fuel control in accordance with claim 25, wherein said predetermined functions include trajectories for guiding said generator to a synchronization point in minimum time consistent with minimizing temperature stress on said turbine.

27. An automatic synchronization fuel control for guiding an AC generator having an output into synchronization with an AC power system, said generator output and said power system each having respective AC voltages associated therewith, said generator being of a type which is driven by a turbine, said synchronization fuel control comprising:
  first means for determining an instantaneous frequency difference and an instantaneous phase difference between said power system voltage and said generator output voltage;
  second means for providing either a first signal command for supplying a fixed predetermined minimum fuel flow to said turbine or a second signal command for supplying a fixed predetermined maximum fuel flow to said turbine, wherein said fixed predetermined minimum fuel flow is approximately equal to a minimum level of fuel flow required to sustain operation in said turbine, and said fixed predetermined maximum fuel·flow is a maximum level of fuel flow normally called for by a startup controller during turbine acceleration near but below synchronous speed;
  third means for repeatedly comparing said instantaneous frequency difference and said instantaneous phase difference; and
  fourth means for determining, in accordance with predetermined functions, which of said first signal and said second signal should be provided by said second means, said predetermined functions being selected so as to guide said generator to an optimal synchronization point at which a predetermined frequency difference and a predetermined phase difference exist between said generator and said power system.

28. An automatic synchronization fuel control for guiding an AC generator having an output into synchronization with an AC power system, said generator output and said power system each having respective AC voltages associated therewith, said generator being of a type which is driven by a turbine, said synchronization fuel control comprising:
  first means for determining as instantaneous frequency difference and an instantaneous phase difference between said power system voltage and said generator output voltage;
  second means for providing either a first signal command for supplying a fixed predetermined minimum fuel flow to said turbine or a second signal command for supplying a fixed predetermined maximum fuel flow to said turbine;
  third means for repeatedly comparing said instantaneous frequency difference and said instantaneous phase difference; and
  fourth means for determining, in accordance with predetermined functions, which of said first signal and said second signal should be provided by said second means, and including means for determining that, during a normal generator startup, said second means should initially provide said first signal, and should switch to provide said second signal no more than once;
  wherein said predetermined functions are selected so as to guide said generator to an optimal synchronization point at which a predetermined frequency difference and a predetermined phase difference exist between said generator and said power system.

29. An automatic synchronization fuel control in accordance with claim 28, wherein said predetermined functions are selected so that said first signal is never output for longer than a predetermined maximum time duration effective to minimize temperature stress on said turbine.

30. A method in accordance with claim 29, wherein said predetermined maximum time duration for said first signal is in the order of one second.

31. An automatic synchronization fuel control in accordance with claim 28, wherein said predetermined functions include trajectories for guiding said generator to said optimal synchronization point in minimum time consistent with minimizing temperature stress on said turbine.

32. An automatic synchronization fuel control in accordance with claim 31, wherein said predetermined functions are selected such that said first signal is never output for longer than a predetermined maximum time duration effective to minimize temperature stress on said turbine.

33. An automatic synchronization fuel control in accordance with claim 32, wherein said predetermined functions include trajectories for guiding said generator to said optimal synchronization point in minimum time consistent with minimizing temperature stress on said turbine.

34. An automatic synchronization fuel control in accordance with claim 28, wherein said third means is of a type which performs said repeated comparison of said instantaneous phase difference and said instantaneous frequency difference at intervals at least in the order of once every one-tenth second.

35. A method for guiding an AC generator having an output into synchronization with an AC power system, said generator output and said power system each having respective voltages associated therewith, said generator being of a type which is driven by a turbine, said method comprising:
  determining, on a substantially continuous basis, an instantaneous frequency difference and an instantaneous phase difference between said power system voltage and said generator output voltage;
  comparing, on a substantially continuous basis, said instantaneous frequency difference and said instantaneous phase difference between said power system voltage and said generator output voltage, said comparison having a result and being performed in accordance with predetermined functions to determine which of a fixed predetermined minimum fuel flow and a fixed predetermined maximum fuel flow should be provided to said turbine; and commanding either said fixed predetermined minimum fuel flow to said turbine or said fixed predetermined maximum fuel flow to said turbine depending upon said result;

wherein said fixed predetermined minimum fuel flow is approximately equal to a minimum level of fuel flow required to sustain operation in said turbine, and said fixed predetermined maximum fuel flow is a maximum level of fuel flow normally called for by a startup controller during turbine acceleration near but below synchronous speed; and wherein said predetermined functions are selected so as to guide said generator to an optimal synchronization point at which a predetermined frequency difference and a predetermined phase difference exist.

36. A method for guiding an AC generator having an output into synchronization with an AC power system, said generator output and said power system each having respective voltages associated therewith, said generator being of a type which is driven by a turbine, said method comprising:

determining, on a substantially continuous basis, an instantaneous frequency difference and an instantaneous phase difference between said power system voltage and said generator output voltage;

comparing, on a substantially continuous basis, said instantaneous frequency difference and said instantaneous phase difference, said comparison having a result and being performed in accordance with predetermined functions to determine which of a fixed predetermined minimum fuel flow and a fixed predetermined maximum fuel flow should be provided to said turbine; and commanding either said fixed predetermined minimum fuel flow to said turbine or said fixed predetermined maximum fuel flow to said turbine depending upon said result;

wherein said predetermined functions are selected so as to guide said generator to an optimal synchronization point at which a predetermined frequency difference and a predetermined phase difference exist, said predetermined functions being further selected so that, during a normal generator startup, said fixed predetermined maximum fuel flow command signal is initially provided, and there is no more than one switch made to provide said fixed predetermined minimum fuel flow command signal.

37. A method in accordance with claim 36, wherein said predetermined functions are selected so that said fixed predetermined minimum fuel flow command is never provided for longer than a predetermined maximum time duration effective to minimize temperature stress on said turbine.

38. A method in accordance with claim 37, wherein said predetermined maximum time duration for said fixed predetermined minimum fuel command is in the order of one second.

39. A method in accordance with claim 36, wherein said predetermined functions include trajectories for guiding said generator to said optimal synchronization point in minimum time consistent with minimizing temperature stress on said turbine.

40. A method in accordance with claim 39, wherein said predetermined functions are selected so that said fixed predetermined minimum fuel flow command is never provided for longer than a predetermined maximum time duration effective to minimize temperature stress on said turbine.

41. A method in accordance with claim 40, wherein said predetermined maximum time duration for said fixed predetermined minimum fuel command is in the order of one second.

42. A method for guiding an AC generator having an output into synchronization with an AC power system, said generator output and said power system each having respective voltages associated therewith, said generator being of a type which is driven by a turbine, said method comprising:

determining, on a repeated basis, an instantaneous frequency difference and an instantaneous phase difference between said power system voltage and said generator output voltage;

comparing, on a repeated basis, said instantaneous frequency difference and said instantaneous phase difference between said power system voltage and said generator output voltage, said comparison having a result and being performed in accordance with predetermined functions to determine which of a fixed predetermined minimum fuel flow and a fixed predetermined maximum fuel flow should be provided to said turbine; and commanding either said fixed predetermined minimum fuel flow to said turbine or said fixed predetermined maximum fuel flow to said turbine depending upon said result;

wherein said fixed predetermined minimum fuel flow is approximately equal to a minimum level of fuel flow required to sustain operation in said turbine, and said fixed predetermined maximum fuel flow is a maximum level of fuel flow normally called for by a startup controller during turbine acceleration near but below synchronous speed; and wherein said predetermined functions are selected so as to guide said generator to an optimal synchronization point at which a predetermined frequency difference and a predetermined phase difference exist.

43. A method for guiding an AC generator having an output into synchronization with an AC power system, said generator output and said power system each having respective voltages associated therewith, said generator being of a type which is driven by a turbine, said method comprising:

determining, on a repeated basis, an instantaneous frequency difference and an instantaneous phase difference between said power system voltage and said generator output voltage;

comparing, on a repeated basis, said instantaneous frequency difference and said instantaneous phase difference, said comparison having a result and being performed in accordance with predetermined functions to determine which of a fixed predetermined minimum fuel flow and a fixed predetermined maximum fuel flow should be provided to said turbine; and commanding either said fixed predetermined minimum fuel flow to said turbine or said fixed predetermined maximum fuel flow to said turbine depending upon said result;

wherein said predetermined functions are selected so as to guide said generator to a synchronization point at which a predetermined frequency difference and a predetermined phase difference exist, said predetermined functions being further selected so that, during a normal generator startup, said fixed predetermined maximum fuel flow command signal is initially provided, and there is no more than one switch made to provide said fixed predetermined minimum fuel flow command signal.

44. A method in accordance with claim 43, wherein said predetermined functions are selected so that said fixed predetermined minimum fuel flow command is never provided for longer than a predetermined maximum time duration effective to minimize temperature stress on said turbine.

45. A method in accordance with claim 44, wherein said predetermined maximum time duration for said fixed predetermined minimum fuel command is in the order of one second.

46. A method in accordance with claim 43, wherein said predetermined functions include trajectories for guiding said generator to an optimal synchronization point in minimum time consistent with minimizing temperature stress on said turbine.

47. A method in accordance with claim 46, wherein said predetermined functions are selected so that said fixed predetermined minimum fuel flow command is never provided for longer than a predetermined maximum time duration effective to minimize temperature stress on said turbine.

48. A method in accordance with claim 47, wherein said predetermined maximum time duration for said fixed predetermined minimum fuel command is in the order of one second.

49. A method in accordance with claim 44, wherein said comparison of said instantaneous frequency difference and said instantaneous phase difference is performed at intervals at least in the order of once every one-tenth second.

50. An automatic synchronization fuel control for guiding an AC generator, which rotates at a variable speed, into synchronization with an AC power system, said generator being of a type which is driven by a turbine, said synchronization fuel control comprising:
   first means for driving said speed of said generator along one of a constant acceleration trajectory and a constant deceleration trajectory in a phase-frequency plane;
   second means for intercepting another of said constant acceleration trajectory and said constant deceleration trajectory which passes through an optimal synchronization point in said phase-beginning plane; and
   third means for driving said speed of said generator along said other of said constant acceleration trajectory and said constant deceleration trajectory until said speed intersects said optimal synchronization point.

51. A method for guiding an AC generator which rotates at a variable speed, into synchronization with an AC power system, said generator being of a type which is driven by a turbine, said synchronization fuel control comprising:
   driving said speed of said generator along a constant acceleration trajectory in a phase-frequency plane;
   intercepting a one of the other of a said constant acceleration trajectory and said constant deceleration trajectory which passes through an optimal synchronization point in said phase-frequency plane; and
   driving said speed of said generator along said other of said constant acceleration trajectory and said constant deceleration trajectory until said speed intersects said optimal synchronization point.

* * * * *